United States Patent
Yamaguchi et al.

(10) Patent No.: US 8,772,636 B2
(45) Date of Patent: Jul. 8, 2014

(54) WIRE HARNESS INSTALLATION STRUCTURE AND WIRE HARNESS-FLATTENING BAND

(75) Inventors: Atsuyoshi Yamaguchi, Kosai (JP); Yuuji Kojima, Kosai (JP)

(73) Assignee: Yazaki Corporation, Tokyo (JP)

( * ) Notice: Subject to any disclaimer, the term of this patent is extended or adjusted under 35 U.S.C. 154(b) by 52 days.

(21) Appl. No.: 13/001,466

(22) PCT Filed: Jun. 25, 2009

(86) PCT No.: PCT/JP2009/061643
§ 371 (c)(1),
(2), (4) Date: Mar. 24, 2011

(87) PCT Pub. No.: WO2009/157517
PCT Pub. Date: Dec. 30, 2009

(65) Prior Publication Data
US 2011/0162885 A1 Jul. 7, 2011

(30) Foreign Application Priority Data

Jun. 25, 2008 (JP) .............................. P2008-166251
Aug. 22, 2008 (JP) .............................. P2008-213682

(51) Int. Cl.
*H02G 3/04* (2006.01)
*H01B 7/00* (2006.01)
*F16L 3/08* (2006.01)
*F16L 3/12* (2006.01)

(52) U.S. Cl.
USPC ...... 174/72 A; 174/68.1; 174/68.3; 174/71 R; 174/72 R; 248/68.1; 248/74.3

(58) Field of Classification Search
USPC ........... 248/68.1, 74.1–74.3; 174/70 R, 71 R, 174/72 R, 72 A, 135, 68.1, 68.3, 113 R, 174/117 R, 117 F
See application file for complete search history.

(56) References Cited

U.S. PATENT DOCUMENTS 3,861,015 A * 1/1975 Hooven .......................... 29/755
4,229,615 A   10/1980 Orr, Jr. et al.
(Continued)

FOREIGN PATENT DOCUMENTS

CN    1240533 A    1/2000
CN    1402398 A    3/2003
(Continued)

OTHER PUBLICATIONS

International Search Report for PCT/JP2009/061643 dated Oct. 13, 2009, 4 pages [PCT/ISA/210].
(Continued)

*Primary Examiner* — Angel R Estrada
*Assistant Examiner* — Dimary Lopez
(74) *Attorney, Agent, or Firm* — Sughrue Mion, PLLC

(57) ABSTRACT

The object is to provide a wire harness installation structure which can enhance an operation efficiency when installing a wire harness and can also achieve a space-saving design of an installation region. In the wire harness installation structure in which a wire harness 10 formed by bundling a plurality of wires 42 into a generally-circular form in a cross-sectional view is installed, the wire harness 10 has a flat portion 10a which is formed by thinning and flattening part thereof along an extending direction thereof and is kept in a flat shape, and by doing so, the installing operation is easy, and the installation region is made space-saving.

16 Claims, 25 Drawing Sheets

(56) References Cited

U.S. PATENT DOCUMENTS

| | | | |
|---|---|---|---|
| 4,564,163 A | | 1/1986 | Barnett |
| 4,880,943 A | * | 11/1989 | Kuzuno et al. ............... 174/72 A |
| 5,188,319 A | * | 2/1993 | Hawash et al. .............. 248/68.1 |
| 5,401,905 A | * | 3/1995 | Lesser et al. ................ 174/99 R |
| 5,767,442 A | | 6/1998 | Eisenberg et al. |
| 5,828,009 A | * | 10/1998 | James et al. ................. 174/135 |
| 5,962,814 A | * | 10/1999 | Skipworth et al. ........... 174/135 |
| 6,084,181 A | | 7/2000 | Lilienthal, II et al. |
| 6,149,109 A | * | 11/2000 | Stankowski ................ 248/74.3 |
| 6,164,604 A | * | 12/2000 | Cirino et al. ................ 248/74.3 |
| 6,173,101 B1 | | 1/2001 | Bourghelle et al. |
| 6,206,331 B1 | * | 3/2001 | Keith et al. ................. 248/74.1 |
| 6,392,147 B1 | * | 5/2002 | Hier et al. ................... 174/70 C |
| 6,945,027 B2 | * | 9/2005 | Blase ............................ 59/78.1 |
| 7,301,101 B2 | * | 11/2007 | Suzuki ........................ 174/68.1 |
| 7,381,898 B2 | * | 6/2008 | Ide .............................. 174/72 A |
| 7,563,981 B2 | * | 7/2009 | Ichikawa et al. ........... 174/72 A |
| 2002/0046869 A1 | | 4/2002 | Shimizu et al. |
| 2003/0030206 A1 | | 2/2003 | Masukawa et al. |
| 2006/0266541 A1 | | 11/2006 | Hirata et al. |
| 2007/0007029 A1 | | 1/2007 | Suzuki |
| 2007/0110914 A1 | | 5/2007 | Masukawa et al. |
| 2007/0193770 A1 | | 8/2007 | Ueno et al. |
| 2008/0008560 A1 | | 1/2008 | Wakabayashi et al. |
| 2009/0188716 A1 | * | 7/2009 | Nagase ....................... 174/72 A |

FOREIGN PATENT DOCUMENTS

| | | |
|---|---|---|
| CN | 1661730 A | 8/2005 |
| CN | 1893211 A | 1/2007 |
| CN | 201130833 Y | 10/2008 |
| EP | 0 855 721 A1 | 7/1998 |
| EP | 1 758 133 A1 | 2/2007 |
| EP | 1 876 361 A1 | 1/2008 |
| GB | 881847 A | 11/1961 |
| JP | 11-346415 A | 12/1999 |
| JP | 2003-324828 A | 11/2003 |
| JP | 2004-236447 A | 8/2004 |
| JP | 2006-304538 A | 11/2006 |
| WO | 97/23883 A1 | 7/1997 |

OTHER PUBLICATIONS

Search Report dated Mar. 22, 2013 issued by the European Patent Office in counterpart European Patent Application No. 09770227.8.
Search Report dated Mar. 22, 2013 issued by the European Patent Office in counterpart European Patent Application No. 12008016.3.
Office Action dated Nov. 1, 2013, issued by the European Patent Office in corresponding European Application No. 12 008 016.3.
Office Action dated Mar. 29, 2013 issued by the State Intellectual Property Office of the People's Republic of China in counterpart Chinese Patent Application No. 200980124728.2.
Office Action dated Nov. 29, 2013 issued by the Patent Office of the People's Republic of China in counterpart Chinese Patent Application No. 200980124728.2.

* cited by examiner

WIRE HARNESS INSTALLATION STRUCTURE AND WIRE HARNESS-FLATTENING BAND

TECHNICAL FIELD

The present invention relates to a wire harness installation structure and a wire harness-flattening band, and particularly relates to improvements for enhancing the efficiency of an installing operation and also for making an installation region space-saving.

BACKGROUND ART

Among vehicle seats, there are ones which are provided with an electrically-operated seat device for adjusting the position of a seat cushion in a forward-rearward direction and an upward-downward direction in accordance with the posture of a passenger and for making a reclining movement of a seat back and also with an air bag unit device for expanding an air bag between the passenger and a side door. A wire harness for supplying electric power to electrically-operated parts is installed in the vehicle seat on which such devices are mounted.

FIG. 22 and FIG. 23 show a conventional example of a wire harness installation structure in a vehicle seat. As shown in FIG. 22 and FIG. 23, the wire harness installation structure 1100 is such that within the vehicle seat 1106 in which a seat back 1104 is reclinably mounted on side frames 1102 (to which a seat cushion (not shown) is attached) through a horizontal pivot shaft 1105, a wire harness 1108 is installed on the seat back 1104 from the lower side of the seat.

The wire harness 1108 is covered with and protected by a corrugated tube 1109 on an installation path. An intermediate portion 1109a of the wire harness 1108 is installed along the pivot shaft 1105 in parallel relation thereto, and this intermediate portion 1109a is fixed to the pivot shaft 1105 by a clamp 1110, and those portions continuous respectively with both sides of the intermediate portion 1109a are fixed respectively to the seat cushion and the seat back 1104 by respective clamps 1112 and 1114.

A wire harness installation structure of this kind is disclosed also in Patent Literature 1 mentioned below.

Another wire harness installation structure is disclosed in Patent Literature 2 mentioned below. The construction described in Patent Literature 2 will be explained below.

A wire harness W/H to be installed within a vehicle includes a portion Sa covered with a tubular portion 1030 of a grommet as shown in FIG. 24, and a portion Sb covered with a bellows portion 1031 as shown in FIG. 25.

The portion Sa covered with the tubular portion 1030 was deformed into a flat shape, using a protector 1035 as shown in FIG. 25, and was fixed to a vehicle panel or the like. By thus flattening the wire harness W/H, the wire harness W/H can be installed even in a narrow space.

The protector 1035 is constructed such that a body portion 1036 and a lid portion 1037 are interconnected through a thin hinge 1038, and a retaining claw (not shown) formed at one end of the lid portion 1037 is retained on an end portion of a lower portion 1036a of the body portion 1036. Further, a clip 1039 for fixing the protector 1035 to the vehicle panel or the like is provided at the lower side of the lower portion 1036a.

For flattening the wire harness W/H, the lid portion 1037 is pivotally moved about the hinge 1038 in a clockwise direction (in FIG. 25), thereby opening one side face of the body portion 1036. Then, the wire harness W/H is inserted into the body portion 1036, and the lid portion 1037 is closed, thereby flattening the wire harness W/H and also integrating the wire harness with the protector 1035 as shown in FIG. 25.

PRIOR ART LITERATURE

Patent Literature

Patent Literature 1: JP-A-2006-304538
Patent Literature 2: JP-A-2004-236447

SUMMARY OF THE INVENTION

Problem that the Invention is to Solve

However, with the improvement of the function of vehicle seats, the number of electrically-operated parts has increased, and with respect to wire harnesses used for supplying electric power to the electrically-operated parts, the number of wires bundled together has increased, so that there is a tendency for the bundle to become larger in diameter. With the construction described in Patent Literature 1 and so on, it is difficult to bend a wire harness of such a thick bundle so that it can be received in the inside of the vehicle sheet which is a narrow space, and there is a problem that the efficiency of the operation is bad.

Furthermore, since it is difficult to bend the wire harness of a thick bundle, the radius of bending of the wire harness becomes large, so that there is a problem that a large installation space is needed.

Furthermore, in the wire harness installation structure described in the above Patent Literature 2, the protector 1035 is need for flattening the wire harness W/H. Therefore, a space for the protector 1035 is required at a position where the wire harness W/H is to be flattened. Therefore, when there was no space for accommodating the protector 1035, it was difficult to install the wire harness W/H in a flattened condition.

Furthermore, protectors of various kinds are need according to the length, thickness, etc., of wire harnesses W/H, and therefore there is a problem that molds of various kinds for the production of the protectors must be prepared.

A first object of the present invention is to solve the above problems, and is to provide a wire harness installation structure which can enhance the efficiency of a wire harness installing operation, and also can make an installation region space-saving.

A second object of the present invention has been achieved in view of the above problems, and is to provide a wire harness-flattening band so constructed as to enable a wire harness to be easily installed in such a manner that a desired portion thereof is flattened without using any special member such as a protector, and also to be able to restrain displacement of the wire harness.

Means for Solving the Problem

The first object of the present invention is achieved by the following construction.

(1) A wire harness installation structure in which a wire harness formed by bundling a plurality of wires into a generally-circular form in a cross-sectional view is installed,
   wherein the wire harness has a flat portion which is formed by thinning and flattening a part of a bundle of the plurality of wires over a predetermined length along an extending direction of the wire harness and are kept in a flat shape.

(2) A wire harness installation structure as set forth in the above (1), wherein the bundle of the plurality of wires is covered by a protective member made by resin along the extending direction, and are kept, together with the protective member, in the flat shape.

(3) A wire harness installation structure as set forth in the above (1) or (2), wherein the bundle of the plurality of wires is kept in the flat shape by a binding member.

(4) A wire harness installation structure as set forth in the above (1) or (2), wherein the bundle of the plurality of wires is received in a protector which includes a receiving space having a flat shape in the cross sectional view for receiving the bundle of the plurality of wires, so that the bundle of the plurality of wires is kept in the flat shape.

(5) A wire harness installation structure as set forth in any one of the above (1) to (4), wherein an installing direction of the wire harness is changed by bending the flat portion.

The second object is achieved by the following construction.

(6) A wire harness-flattening band for partially flattening a linear member including a wire bundle of a wire harness, comprising:
a wire harness fixing portion; and
a binding member that fastens an outer periphery of the linear member in a direction intersecting a longitudinal direction of the linear member, and fixes the linear member to a surface of the wire harness fixing portion,
wherein a portion of the linear member disposed on the surface of the wire harness fixing portion is pressed against the wire harness fixing portion by a fastening action of the binding member without interposing the binding member between the portion of the linear member and the surface of the wire harness fixing portion so that the portion of the linear member is flattened.

(7) A wire harness-flattening band as set forth in the above (6), wherein the wire harness fixing portion has a plate portion on which the surface is formed, and a surface shape of the plate portion is flat, and the linear member is pressed against the surface by the binding member.

(8) A wire harness-flattening band as set forth in the above (6), wherein the surface of the wire harness fixing portion has a slanting surface so that the flattened portion of the linear member is formed so as to be slant in a direction intersecting the longitudinal direction of the linear member.

(9) A wire harness-flattening band as set forth in the above (6), wherein a protruded portion for bending the flattened portion of the linear member into an arcuate shape in a direction intersecting the longitudinal direction of the linear member is provided on the surface of the wire harness fixing portion.

(10) A wire harness-flattening band as set forth in the above (6), wherein a plurality of protruded portions for bending the flattened portion of the linear member into an arcuate shape in a direction intersecting the longitudinal direction of the linear member are provided on the surface of the wire harness fixing portion, and are spaced a predetermined distance from each other in the longitudinal direction.

(11) A wire harness-flattening band as set forth in any one of the above (6) to (10), wherein a plurality of retaining projections are provided on the surface of the wire harness fixing portion.

(12) A wire harness-flattening band as set forth in any one of the above (6) to (11), wherein the binding member is a binding band passed through a through hole of the wire harness fixing portion which extends in a direction intersecting the longitudinal direction of the linear member.

(13) A wire harness-flattening band as set forth in any one of the above (6) to (12), further comprising a retaining member that is formed integrally with the wire harness fixing portion so as to mount the wire harness fixing portion on the mating mounting member.

In the construction of the above (1), even when the wire bundle forming the wire harness is thick, the wire harness can be easily bent at the flat portion formed by thinning and flattening a part thereof, and therefore the efficiency of the installing operation can be enhanced.

Furthermore, since the wire harness can be easily bent at the flat portion, the bend radius will not become large, and the installation region can be made space-saving.

Furthermore, since the wire harness can be easily bent at the flat portion, a large space is not required for changing the installing direction, and the installation region can be made space-saving.

In the construction of the above (2), the wire harness is covered by the protective member, and therefore even when the wire harness is installed in a narrow space, the wire harness will not be brought into contact with a surrounding member by vibration and so on, and damage of the wire harness can be prevented.

In the construction of the above (3), the flat shape can be maintained by the binding member, and therefore an arbitrary portion of the wire harness can be easily formed into a flat shape. Therefore, the flat portion can be formed at the installation site, and also a portion which is to be formed into a flat shape can be easily changed according to a change of an installation portion. Here, a tape, a tie band or the like can be used as the binding member.

In the construction of the above (4), the flat shape is maintained by the protector, and therefore even when the wire harness is installed in a narrow space, the wire harness will not be brought into contact with a surrounding member by vibration and so on, and damage of the wire harness can be prevented.

In the construction of the above (5), by changing the installing direction by bending the flat portion, the degree of freedom of installation of the wire harness is enhanced.

In the wire harness-flattening band of the above (6), the linear member of the wire harness is fastened and fixed to the wire harness fixing portion by the fastening action of the binding member without interposing the binding member between the linear member and the surface of the wire harness fixing portion, and by doing so, a desired portion of the wire harness can be flattened in conformity with the surface shape of the fixing portion, and also displacement of the wire harness can be restrained.

Incidentally, the flattened condition in the present invention includes, of course, a flat condition and also includes a curved condition. Namely, the flattened condition in the present invention means a condition in which the wire harness of a circular shape in a cross-sectional view is crushed, so that its cross-sectional shape becomes flattened, and the flattened cross-sectional shape may be flat or may be curved.

In the constructions of the above (7), (8) and (9), by fixing the linear member of the wire harness along the surface of the wire harness fixing portion, the linear member can be flattened in a flat condition, a slanting condition or a mountain-shaped condition, and besides since the linear member is fixed by the binding member, displacement thereof can be restrained in both the installing direction and the direction perpendicularly intersecting this installing direction. Particularly by forming them into the slanting condition or the mountain-shaped condition, the fastening effect achieved at the time of the binding operation can be enhanced.

In the construction of the above (10), the plurality of protruded portions are provided on the surface of the wire harness fixing portion, and are spaced the predetermined distance from each other in the installing direction, and therefore the linear member of the wire harness is flattened in conformity with the mountain-shape, and also is fastened at a position between the plurality of protruded portions by the binding member, so that the wire harness is flexibly deformed at this fastened portion, and the restraining of displacement of the wire harness is enhanced.

In the construction of the above (11), the projections are provided on the surface of the wire harness fixing portion, and therefore at the time when the linear members of the wire harness are fixed to the wire harness fixing portion, the projections bite into the wire harness to retain the wire harness, and can positively prevent the displacement of the wire harness.

In the construction of the above (12), the existing binding band can be used as the binding member, and therefore it is not necessary to newly produce a binding member for exclusive use.

In the construction of the above (13), the wire harness fixing portion to which the linear members of the wire harness are fixed is mounted on the mating mounting member by the retaining member, and by doing so, the wire harness can be easily installed in a flat condition.

MODE FOR CARRYING OUT THE INVENTION

Preferred embodiments of wire harness installation structures of the present invention in a vehicle seat will be described below in detail with reference to the drawings.

First Embodiment

Figure 1:
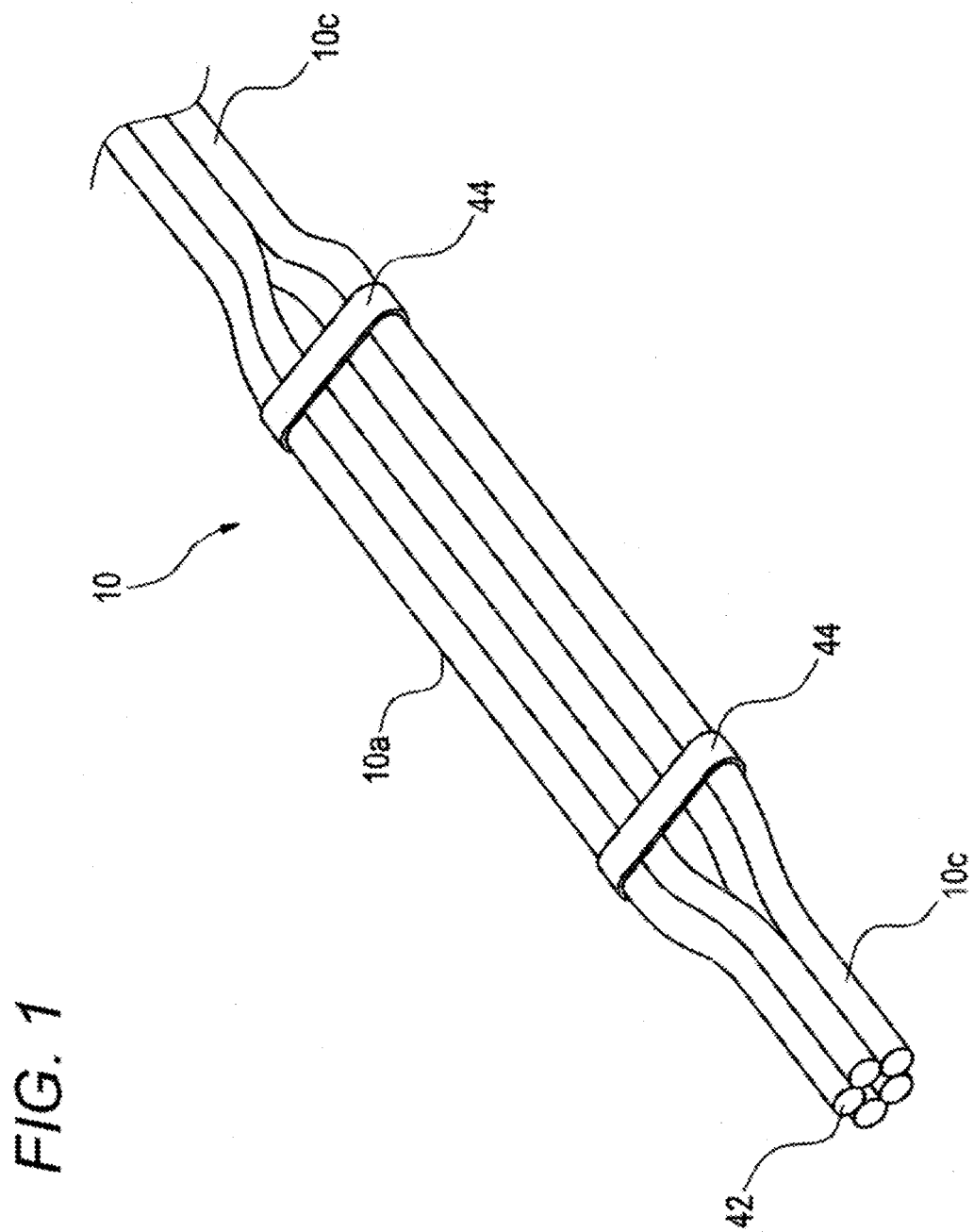
FIG. 1 is a perspective view of a wire harness used in a first embodiment of the present invention.
Figure 2:
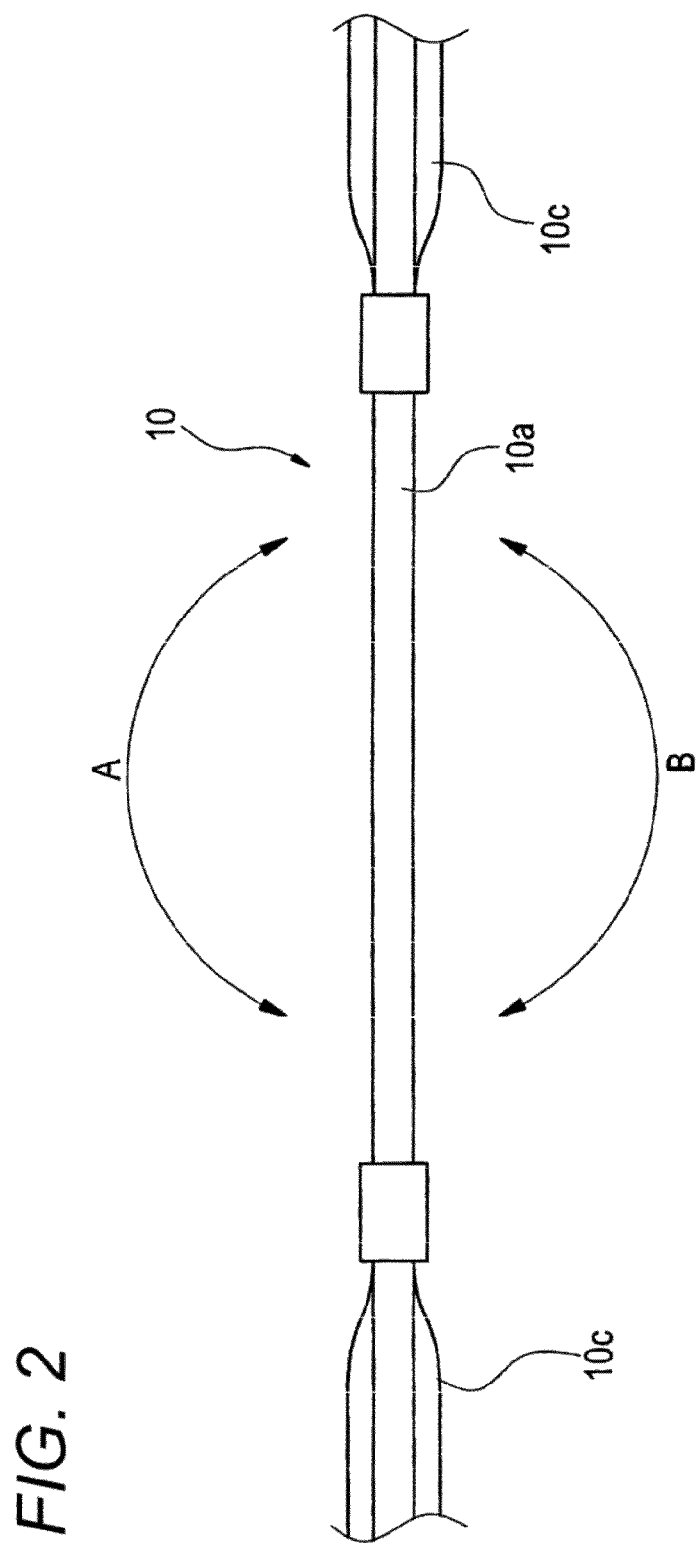
FIG. 2 is a side-elevational view of the wire harness of FIG. 1.
Figure 3:
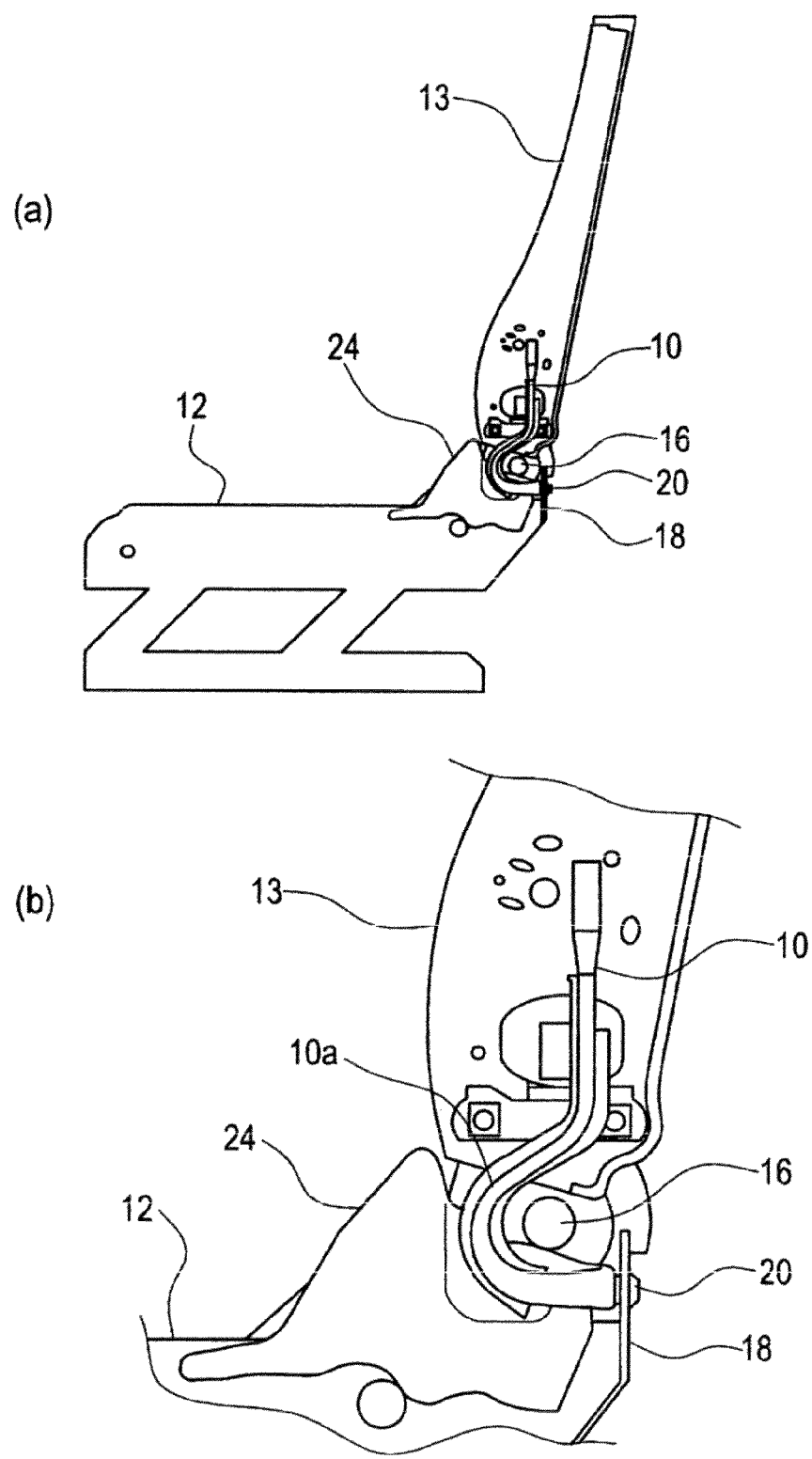
FIG. 3 is views showing the installation of the wire harness of the first embodiment, and FIG. 3 (a) is the view showing the installation in a reclining seat, and FIG. 3 (b) is an enlarged view of an important portion of FIG. 3 (a).

FIG. 1 is a perspective view of a wire harness representing a first embodiment of the invention, FIG. 2 is a side-elevational view of the wire harness of FIG. 1, and FIG. 3 is views showing the installation of the wire harness of FIG. 1, and FIG. 3 (a) is the view showing the installation in a reclining seat, and FIG. 3 (b) is an enlarged view of an important portion of FIG. 3 (a).

The wire harness 10 is formed by a plurality of wires 42 bundled together, and suitable portions of the wire harness 10 spaced from each other in its extending direction are fixed by binding members 44 such as a tape, a tie band or the like. Although the wire harness 10 originally has a generally-circular shape in cross-sectional view over an entire length thereof, a flat portion 10a formed by spreading the bundled wires 42 into a flat condition to thereby thin and flatten the wire harness is provided at a predetermined portion of the wire harness in the extending direction. The flat portion 10a is kept in a flat shape by the binding members 44 such as a tape, a tie band or the like.

The binding members 44 bind the flat portion 10a at the suitable portions including both end portions of the flat portion 10a, and maintain the flat shape of the wire harness 10.

As a result of spreading of the wires 42 into the flat condition, the flat portion 10a is made wider than a cross-sectionally generally-circular portion 10c as shown in FIG. 1, and is made thinner than the cross-sectionally genenerally-circular portion 10c as shown in FIG. 2. Therefore, the flat portion 10a can be easily bent in directions indicated by arrows A and B in FIG. 2.

FIGS. 3(a) and 3(b) show the condition in which the wire harness is installed around a pivot shaft of the reclining seat of the vehicle seats. A connector (not shown) is connected to a supply-side end portion of the wire harness 10 which is led out to the exterior of the seat, and this connector is connector-connected to another wire harness in a passenger compartment. That portion of the wire harness 10 disposed within the seat is branched off into a plurality of branch harnesses, and is connected to various electrically-operated parts (electrical equipments) within the seat.

As shown in FIGS. 3(a) and 3(b), the pivot shaft 16 for pivotally supporting a seat back 13 is mounted on side frames 12, and the seat back 13 is so constructed as to be pivotally moved (reclined) about the pivot shaft 16. A fixing portion 18 for fixing the wire harness 10 is mounted on the side frame 12, and is disposed rearwardly of the pivot shaft 16. An inner trim 24 is attached to an inner side of the side frame 12 so that the vicinity of a pivotal mechanism of the side frame will no be seen from the exterior.

That portion of the wire harness 10 introduced from the side frame 12 is fixed to the fixing portion 18 by a clip 20. The wire harness 10 fixed to the fixing portion 18 is installed in such a manner that it detours around the front side of the pivot shaft 16 and is turned around about two-thirds of the pivot shaft 16, and the wire harness further extends upwardly to be installed within the back seat 13.

The flat portion 10a disposed around the pivot shaft 10 is twisted 90 degrees relative to the flat portion 10a fixed to the fixing portion 18. Namely, the flat portion 10a is disposed in opposed relation to the fixing portion 18 and the pivot shaft 16.

By thus changing the direction of installation of the wire harness 10 by the use of the flat portion 10a, the wire harness 10 can be installed in a bent condition even in the interior of the vehicle seat which is an extremely narrow space. Furthermore, when the wire harness 10 is installed to be bent around the pivot shaft 16, the radius of bending of the flat portion 10a will not become large since it can be easily bent, and the installation region is made space-saving. Furthermore, the flat portion 10a can be installed in such a manner that it is twisted so as to change the direction thereof by 90 degrees, and therefore the efficiency of the installing operation is good, and the degree of freedom of the installation direction is high.

Second Embodiment

Figure 4:
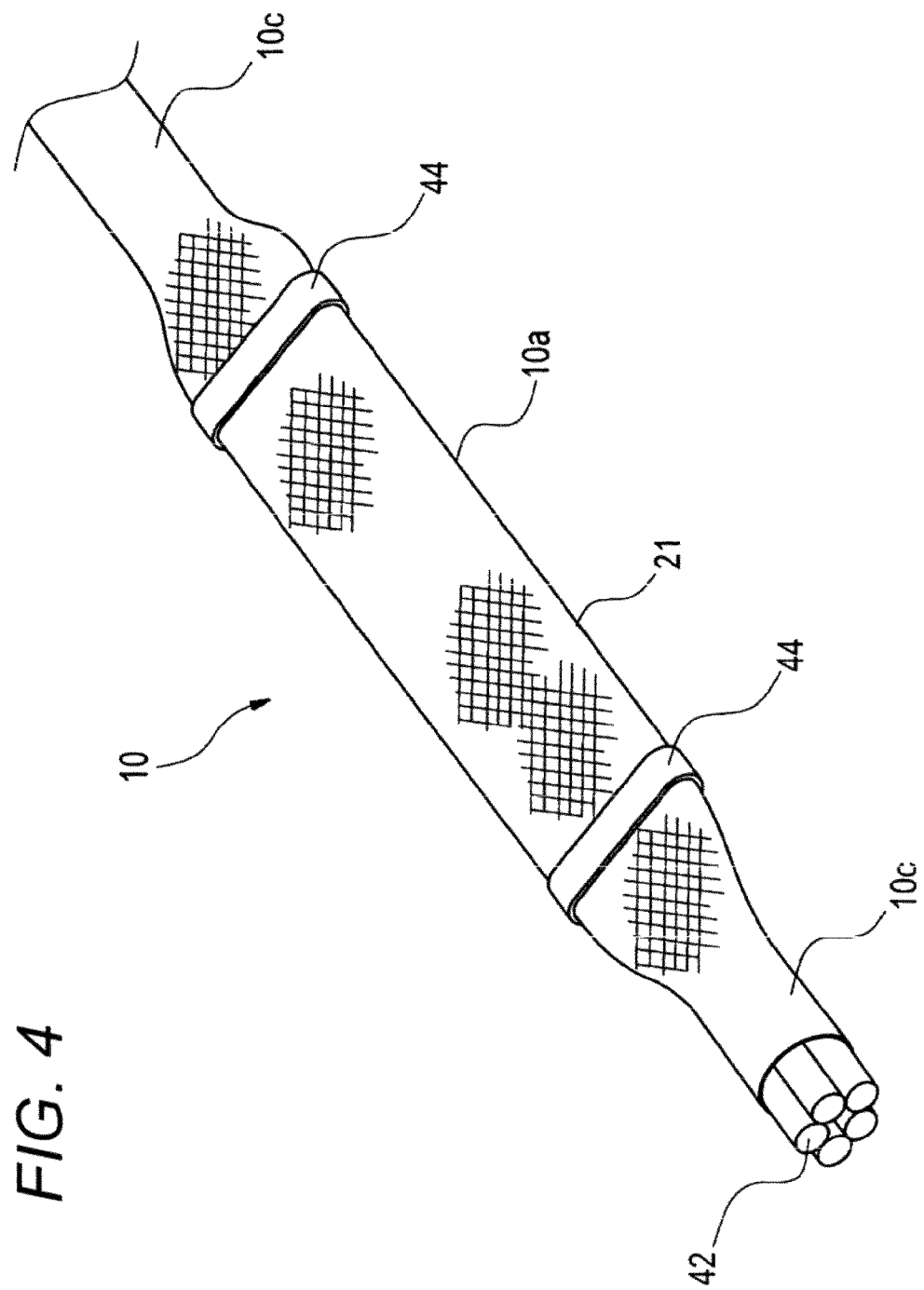
FIG. 4 is a perspective view of a wire harness used in a second embodiment of the present invention.

FIG. 4 is a perspective view of a wire harness used in a second embodiment of the present invention. The wire harness 10 of this second embodiment differs from the first embodiment in that a resin-made protective member 21 is attached to the wire harness 10, and the other construction is the same as that of the first embodiment. The protective member 21 has, for example, a mesh structure, and has such a structure that it can be easily deformed and can be easily bent. As the protective member 21, a mesh tube for wire harness wear prevention purposes manufactured by Federal Mogul System Production Inc. can be used.

The wire harness 10 of the second embodiment is covered by the protective member 21 over an entire area in an extending direction, and a flat portion 10a is formed such that it is deformed together with the protective member 21. Wires 42 forming the wire harness 10 are spread into a flat condition to form a flat shape, and the protective member 21 and the wire harness 10 are bound together by binding members 44 such as a tape, a tie band or the like wound around the outside of the protective member 21, thereby maintaining the flat shape.

Figure 5:
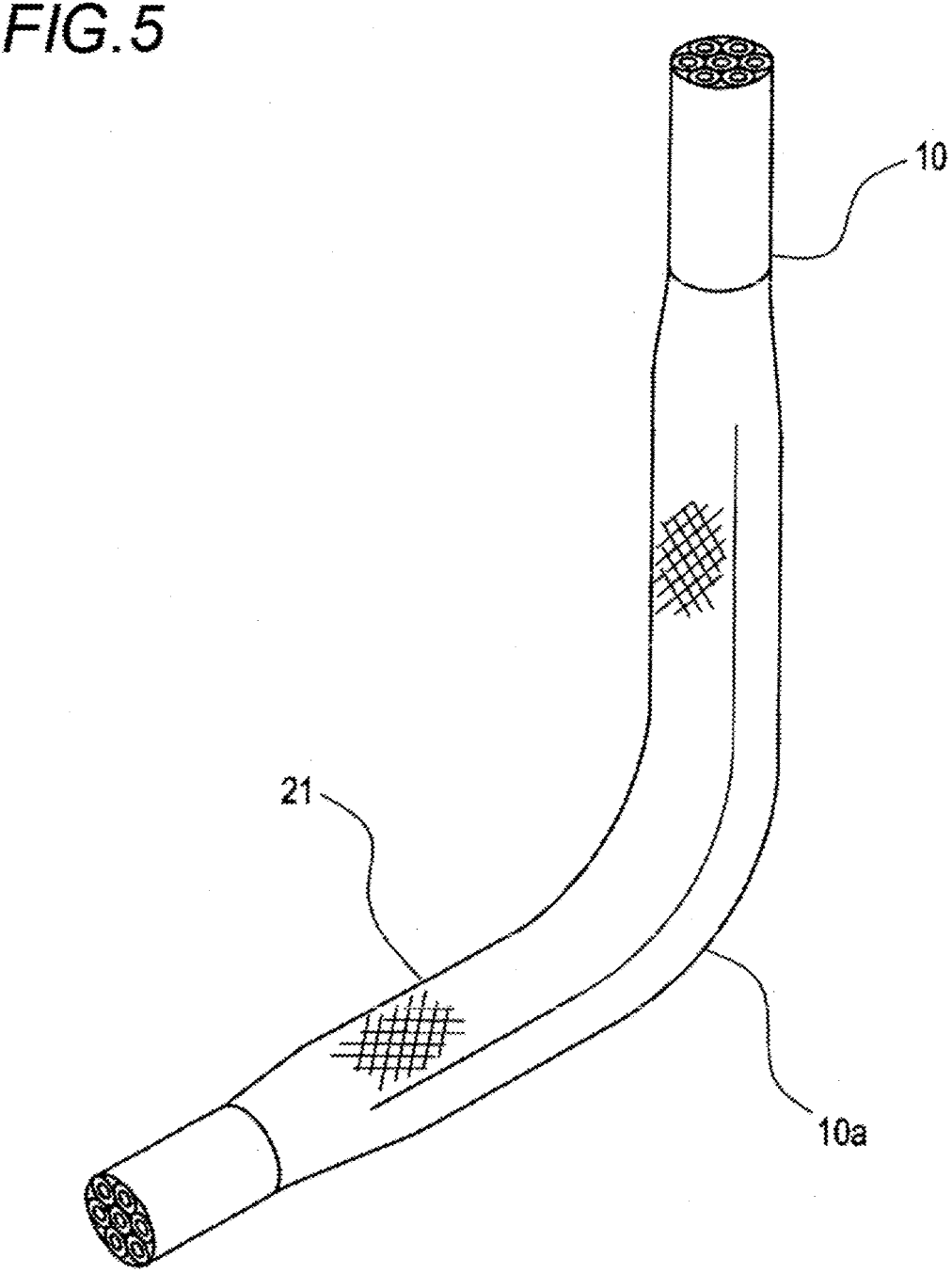
FIG. 5 is a perspective view of a modified wire harness used in the second embodiment of the present invention.

A wire harness installation structure of the second embodiment differs from the first embodiment only in the construction of the wire harness 10 to be used, and the structure of installation on the vehicle seat is the same as that of the first embodiment as shown in FIGS. 3(a) and 3(b). The wire harness 10 of the second embodiment may have a structure shown in FIG. 5, in which the use of the binding members 44 is omitted.

In the wire harness installation structure of the second embodiment, the wire harness 10 is covered by the protective member 21, and therefore even when the installed wire harness 10 is brought into contact with a surrounding member by vibration and so on, the wire harness 10 will not be damaged.

Third Embodiment

Figure 6:
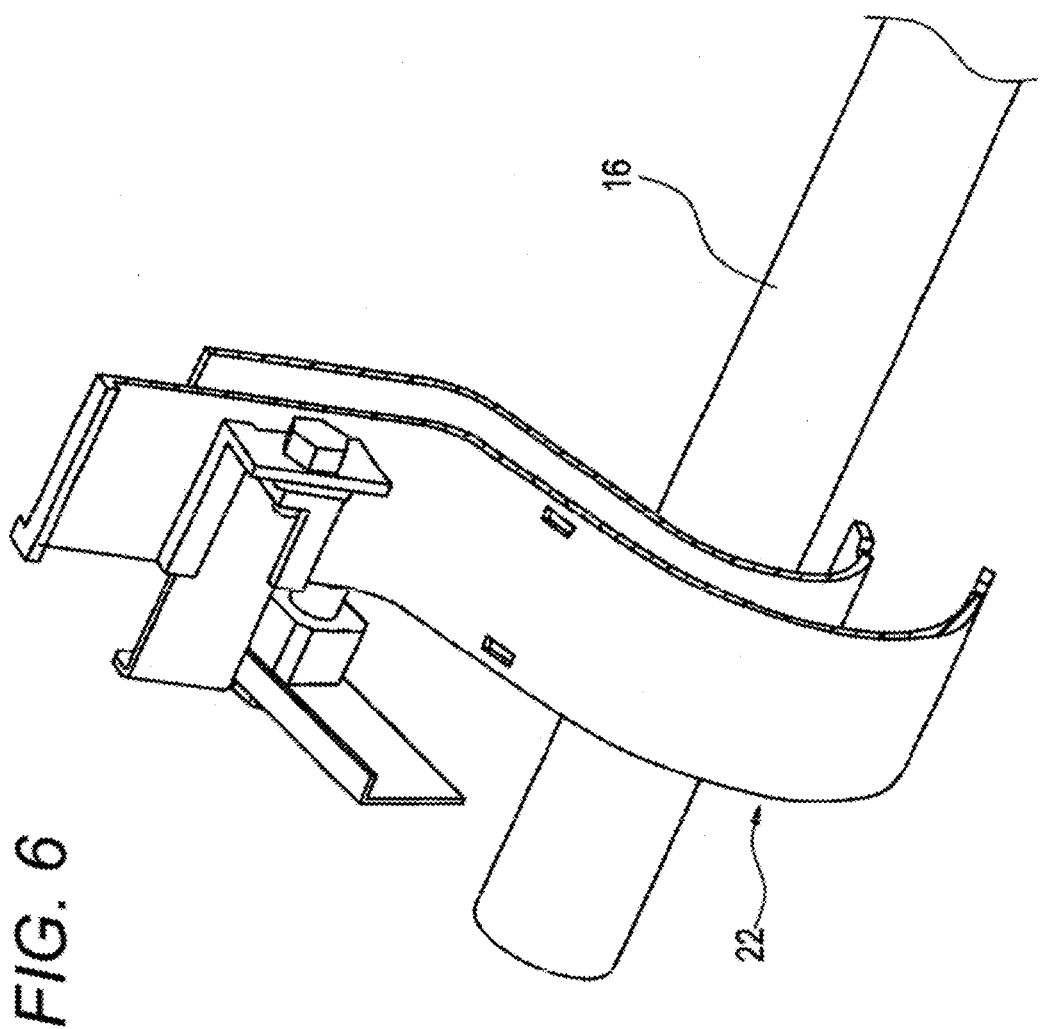
FIG. 6 is partly-broken perspective view of a protector used in a third embodiment of the present invention.

Furthermore, the installation may be made in such a manner that a protector 22 shown in FIG. 6 is attached to each of the wire harnesses 10 of the first embodiment and second embodiment. In this case, the protector 22 may be formed into such a shape that it has a wire harness receiving space of a cross-sectionally flat shape, and the flat shape is maintained by receiving the wire harness 10 in the protector 22. In this case, further, the use of the binding members 44 at the flat portion 10a may be omitted.

FIG. 6 is a partly-broken perspective view of the protector 22 in the case where the flat portion is installed around the pivot shaft of FIGS. 3(a) and 3(b). The protector 22 has the wire harness receiving space curved in accordance with a wire harness installation path around the pivot shaft 16, and this wire harness receiving space is formed into a height corresponding to the thickness of the flat portion 10a of the wire harness 10 and hence being substantially equal to this thickness. Therefore, when the flat portion 10a of the wire harness 10 is received in the protector 22, the flat shape thereof is maintained. And, the wire harness 10 will not be brought into contact with an external member by vibration and so on, and damage of the wire harness 10 can be prevented. Incidentally, for the purpose of showing the wire harness receiving space of the protector 22, the showing of that side wall of the protector 22 disposed at the near side is omitted in FIG. 6.

Next, preferred embodiments of wire harness-flattening bands of the present invention will be described in detail with reference to the drawings.

Fourth Embodiment

Figure 7:
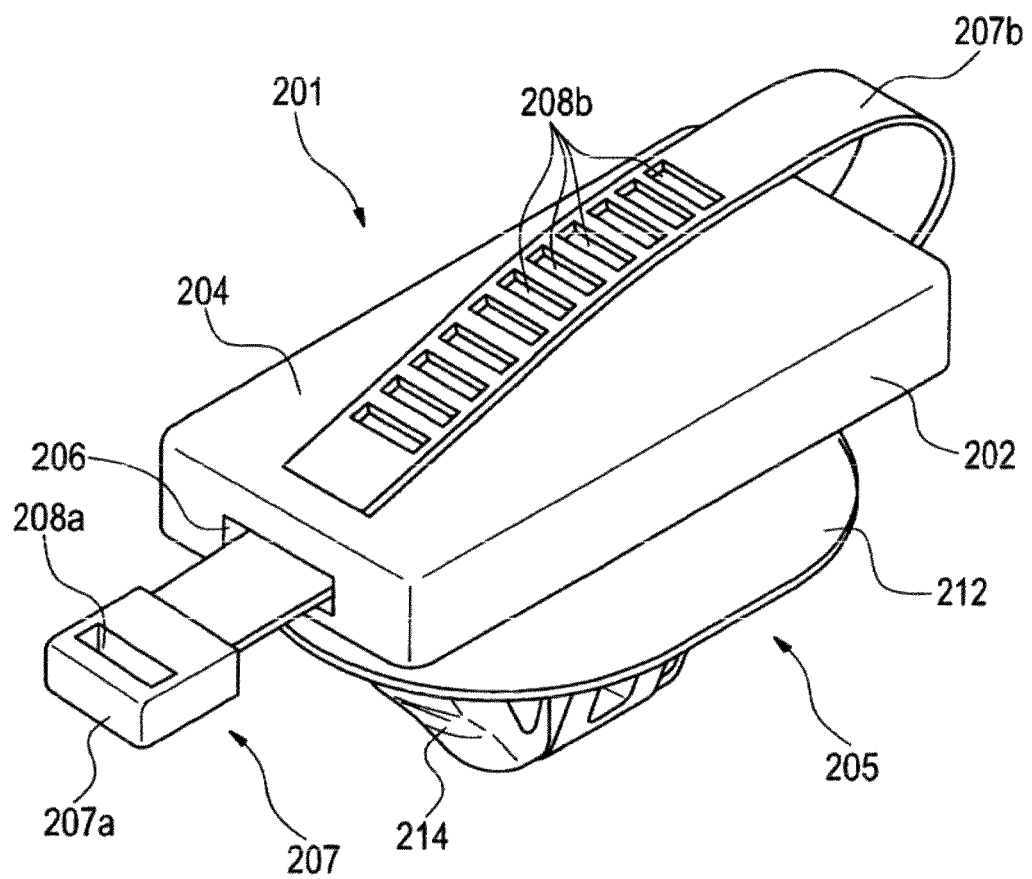
FIG. 7 is a perspective view showing the construction of a wire harness-flattening band representing a fourth embodiment of the present invention.
Figure 8:
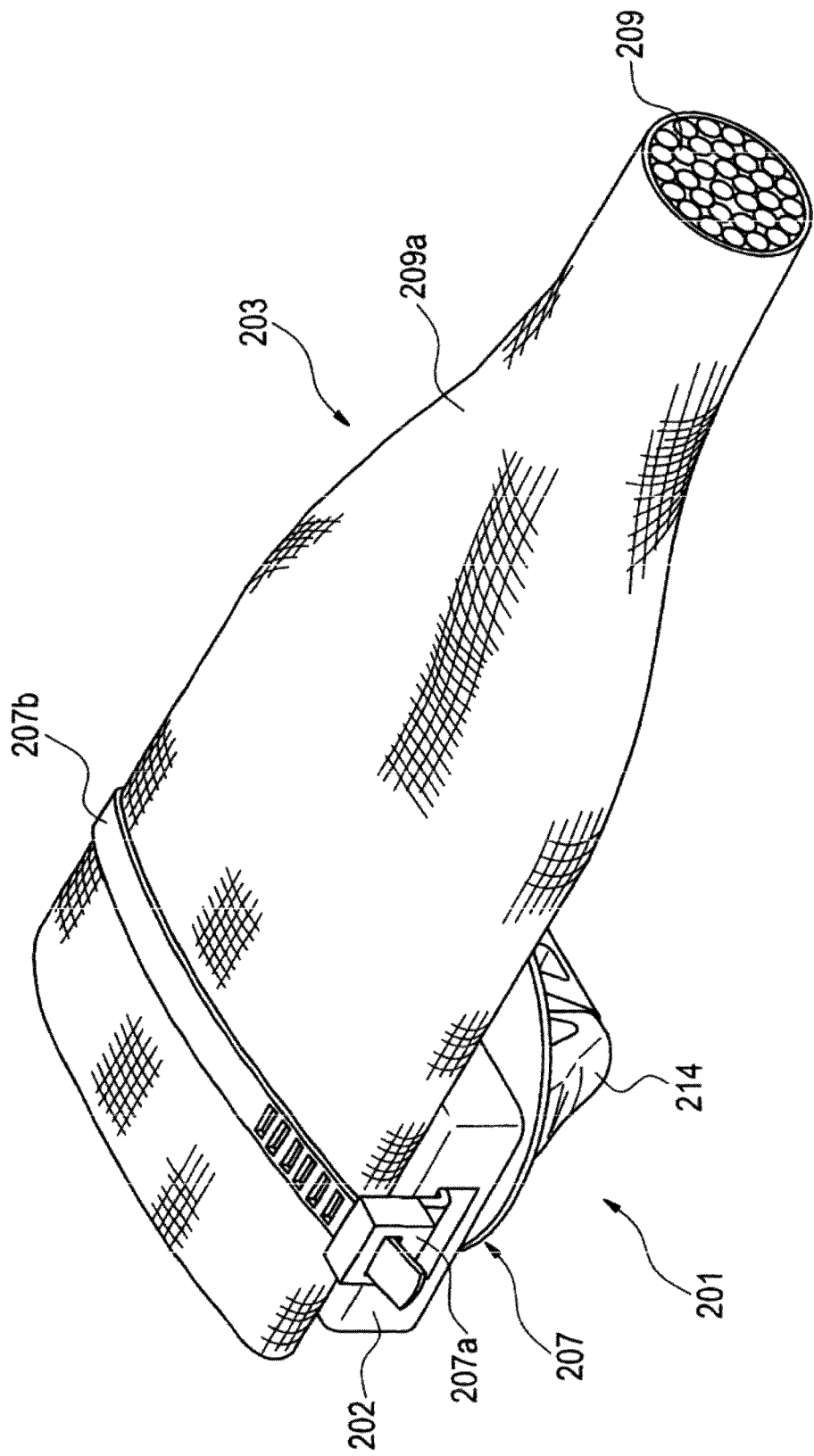
FIG. 8 is a perspective view showing a flattened condition of a wire harness.
Figure 9:
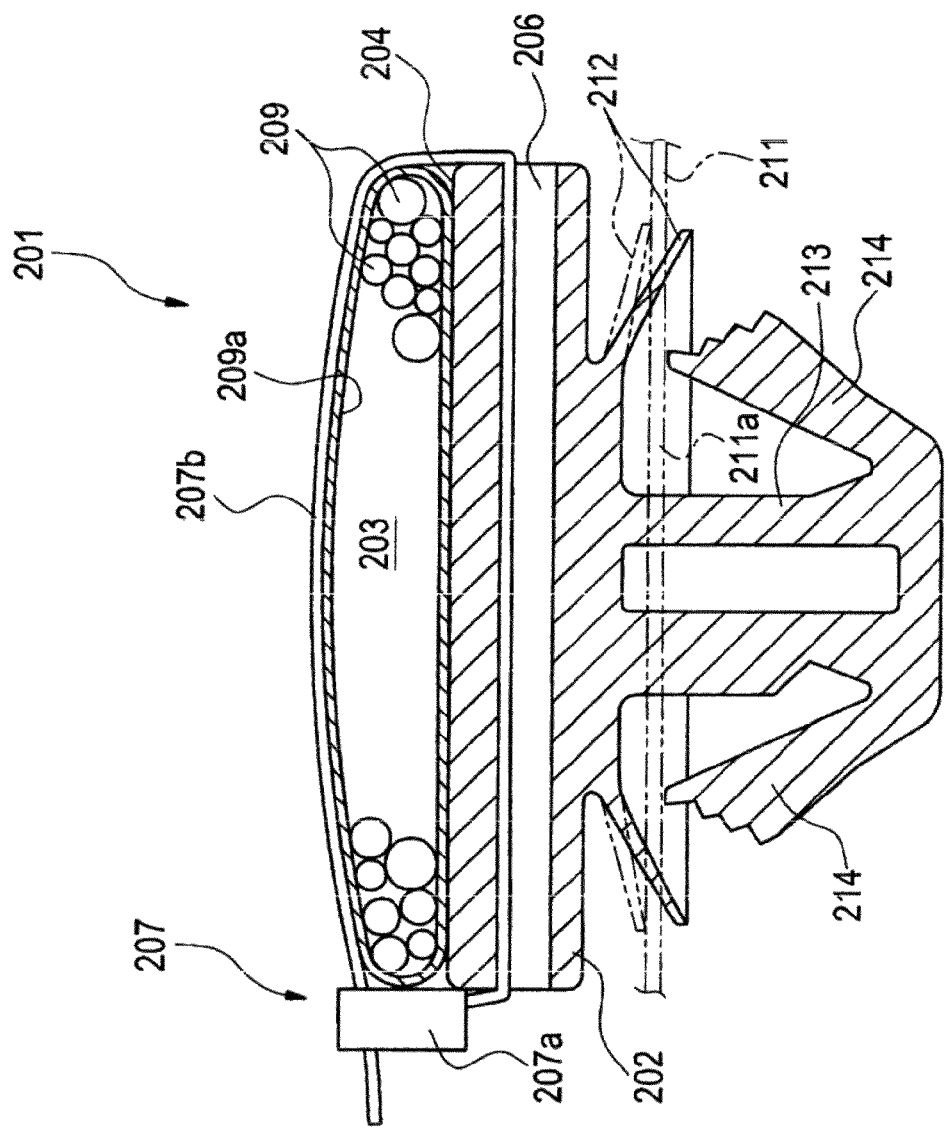
FIG. 9 is a cross-sectional view showing the flattened condition of the wire harness.

FIG. 7 is a perspective view showing the construction of a wire harness-flattening band representing a fourth embodiment of the present invention, FIG. 8 is a perspective view showing a flattened condition of a wire harness, and FIG. 9 is a cross-sectional view showing the flattened condition of the wire harness and a fixed condition thereof relative to a clamp.

As shown in FIG. 7 to FIG. 9, in the wire harness-flattening band (hereinafter referred to as "band") 201, a wire harness fixing portion 204, having a plate portion for fixing linear members (wires and so on) 209 of the wire harness 203, and a retaining member 205 for retaining a base plate portion 202 on a vehicle panel (hereinafter referred to as "panel") or the like are formed integrally on the base plate portion 202 formed into a rectangular plate-like shape. The band 201 may have a construction in which the provision of the retaining member 205 is omitted.

A through hole 206 is formed through a generally central portion of the base plate portion 202 in a longitudinal direction, and a binding band 207 is passed through this through hole 206. The binding bland 207 includes a retaining portion 207a, and a band portion 207b, and an insertion hole 208a is formed through the retaining portion 207a, and a retaining claw (not shown) is provided within this insertion hole.

On the other hand, a plurality of retaining holes 208b are formed through the band portion 207b, and the construction is such that when the band portion 207b is inserted into the insertion hole 208a, the retaining claw (not shown) retains the retaining hole 208b, thereby disenabling the withdrawal.

The wire harness 203 includes the plurality of linear members 209 bundled together into a generally circular transverse cross-sectional shape as shown at a right end in FIG. 8, and its surface is covered by a deformable protective member 209a.

The retaining member 205 includes a flange portion 212 spreading into a cap-like shape, an axis portion 213 formed on and projecting from a central portion of this flange portion, and an elastically deformably-provided retaining portion 214.

On the other hand, an insertion mounting hole 211a is formed through the panel 211 as indicated in imaginary lines in FIG. 9. For fixing the band 201 to the panel 211, a lower end portion of the retaining portion 214 is inserted into the insertion mounting hole 211a, and then is continued to be pushed thereinto. By continuing this pushing operation, the retaining portion 214 is reduced in diameter, and at the time when the retaining portion 214 passes through the insertion mounting hole 211a, it is elastically restored into its original shape. As a result, the flange portion 212 and the retaining portion 214 hold the panel 211 therebetween, so that the whole of the band 201 is fixed to the panel 211.

Next, the flattening of the wire harness 203 and an operation of clamping to the panel 211 of the vehicle or the like will be described.

First, the binding band 207 is passed through the through hole 206, and the retaining portion 207a and the band portion 207b are disposed in an extending condition respectively at the opposite sides of the wire harness fixing portion 204.

Then, the bundled linear members 209 of the wire harness 203 are placed on the wire harness fixing portion 204, and here it is preferred to place the linear members 209 of the wire harness 203 while deforming the linear members 209 into an elliptical transverse cross-sectional shape by beforehand crushing the linear members with the fingers of both hands. Subsequently to this operation, the band portion 207b is wound on the wire harness 203, and a distal end portion of the band portion 207b is passed through the insertion hole 208a, and then this distal end portion is grasped and pulled strongly, thereby fastening the linear members 209 of the wire harness 203 by the binding band 207.

As a result, the whole of the linear members 209 of the wire harness 203 is strongly pressed against the wire harness fixing portion 204. The surface of the wire harness fixing portion 204 is flat, and therefore the linear members 209 are spread in a widthwise direction in conformity with this surface shape, and are flattened as shown in FIGS. 8 and 9.

At the position where the linear members 209 of the wire harness 203 are flattened, the retaining claw provided within the retaining portion 207a retains one of the plurality of retaining holes 208b. Even if the force with which the band portion 207b has been pulled is canceled at this time, the binding band 207 will not become loose, and the flattening of the wire harness and the fixing of the wire harness to the band 201 are effected at the same time.

As described above, after the linear members 209 of the wire harness 203 are fixed to the wire harness fixing portion 204, the lower end of the retaining portion 214 is inserted into the insertion mounting hole 211a formed through the panel 211, and then it is pushed thereinto as described above, thereby fixing the band 201 to the panel 211.

Namely, in this embodiment, by fixing the linear members 209 of the wire harness 203 to the wire harness fixing portion 204, using the binding band 207, the linear members 209 of the wire harness 203 are spread along the surface of the wire harness fixing portion 204, and are flattened, and also are integrated with the band 201. Then, merely by pushing the retaining portion 214 into the insertion mounting hole 211a in the panel 211, the linear members 209 of the flattened wire harness 203 are fixed to the panel 211 in integrally-connected relation to the band 201.

In the above construction, the linear members 209 of the wire harness 203 are fixed to the band 201 by fastening, and therefore are less liable to be displaced in the direction of installation of the wire harness 203 and in other words, in the longitudinal direction.

In addition, a protector requiring a large space is unnecessary, and the wire harness 203 can be installed in a narrow space. Furthermore, there can be obtained various advantages including the advantage that a mold for molding the protector is unnecessary.

Fifth Embodiment

Figure 10:
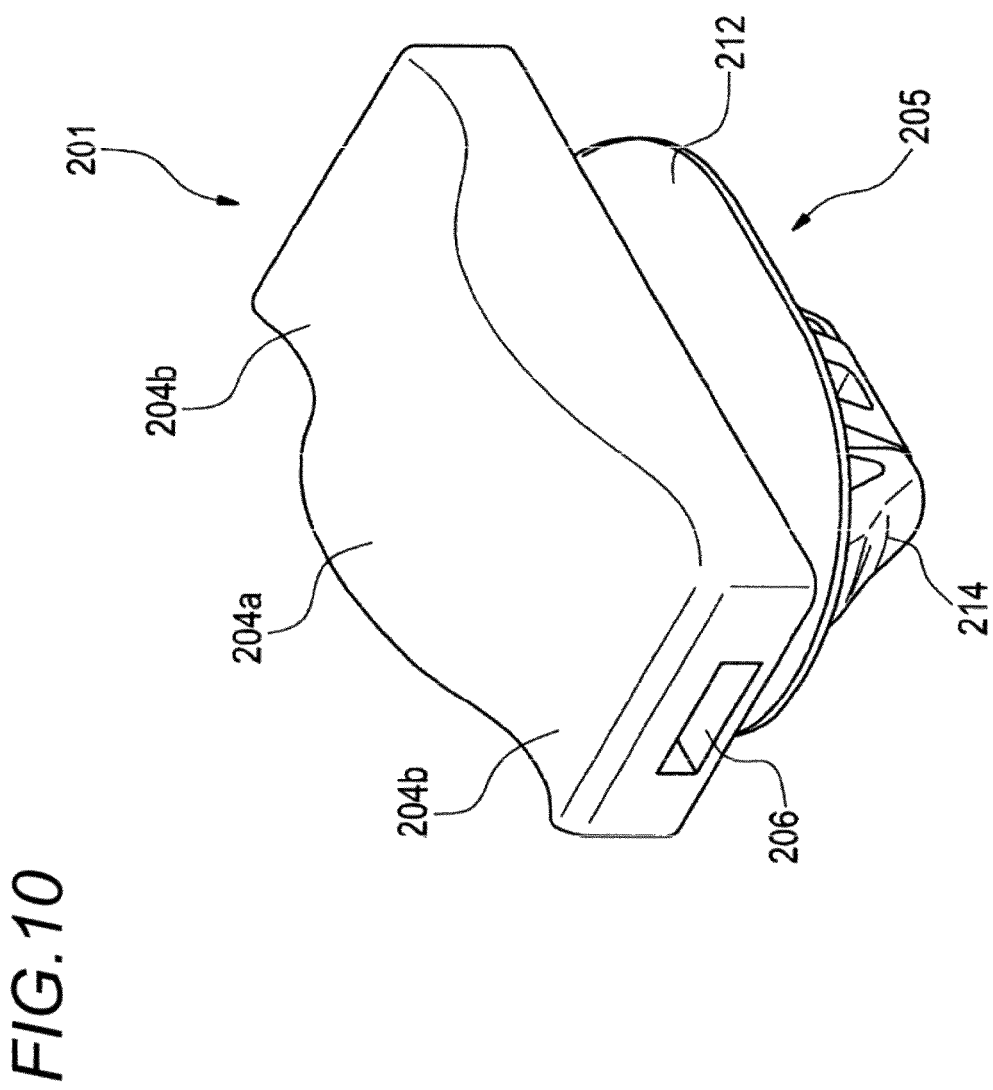
FIG. 10 is a perspective view showing the construction of a wire harness-flattening band representing a fifth embodiment of the present invention.
Figure 11:
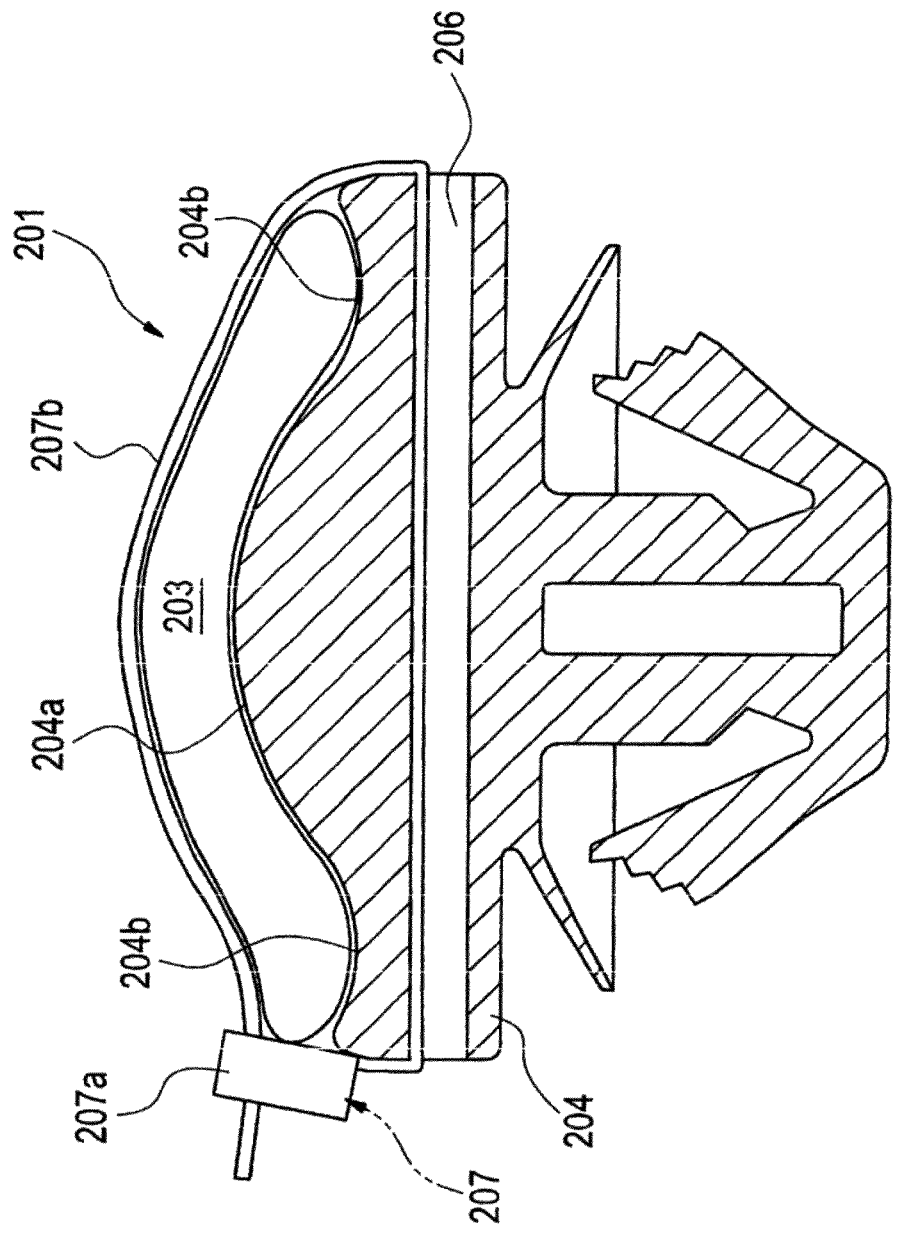
FIG. 11 is a cross-sectional view showing a flattened condition of a wire harness.

FIG. 10 is a perspective view showing the construction of a wire harness-flattening band 201, and FIG. 11 is a cross-sectional view showing a flattened condition of a wire harness.

This embodiment differs from the above fourth embodiment mainly in the surface shape of the fixing portion 204, and the other constructions may be similar to the above constructions. Therefore, the constructions similar to the above constructions will be designated by identical reference numerals, respectively, and explanation thereof will be omitted or simplified.

In the band 201 of this fifth embodiment, a central portion of the upper surface of the wire harness fixing portion 204 is raised in a direction of the thickness to form a protruded portion 204a, and also shallow recesses 204b are formed respectively at opposite sides of the protruded portion 204a. Namely, the protruded portion 204a for bending a flattened portion of linear members (not shown) into an arcuate shape in a direction intersecting a longitudinal direction of the linear members is formed at the surface of the wire harness fixing portion 204. For fixing the linear members of the wire harness 203 to the wire harness fixing portion 204, the linear members of the wire harness 203 are placed on the protruded portion 204a, and a binding band 207 passed through a through hole 206 is wound and is tightened as in the above fourth embodiment.

At this time, a particularly-strong tightening force acts on those portions of the linear members of the wire harness 203 disposed in the vicinity of an apex of the protruded portion 204a, and the linear members of the wire harness 203 are spread along an entire area of a slanting surface of the protruded portion 204a as shown in FIG. 11, so that the linear members of the wire harness 203 are flattened.

For fixing the band 201, fixing the linear members of the wire harness 203, to a panel 211, a retaining portion 214 is pushed into an insertion mounting hole 211a as described above, and then is continued to be pushed thereinto. Then, when the retaining portion 214 passes through the insertion mounting hole 2111a, the retaining portion is opened because of its own elasticity, and the whole of the band 201 is fixed.

In this fifth embodiment, also, the flattening of the wire harness 203 and the restraining of the wire harness 203 from displacement in the direction of installation of the wire harness 203 can be effected without using a protector or the like, and the wire harness 203 can be installed in a narrow space.

Sixth Embodiment

Figure 12:
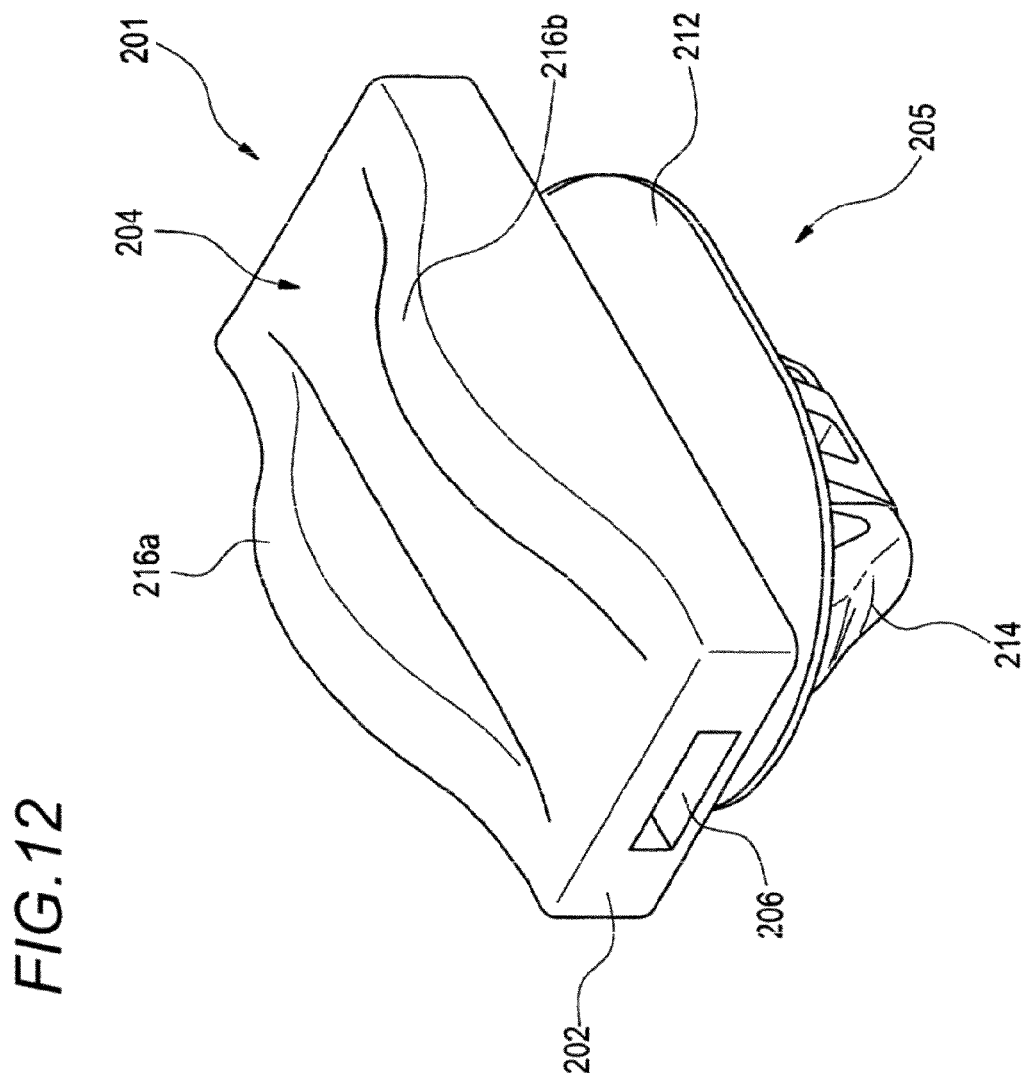
FIG. 12 is a perspective view showing the construction of a wire harness-flattening band representing a sixth embodiment of the present invention.
Figure 13:
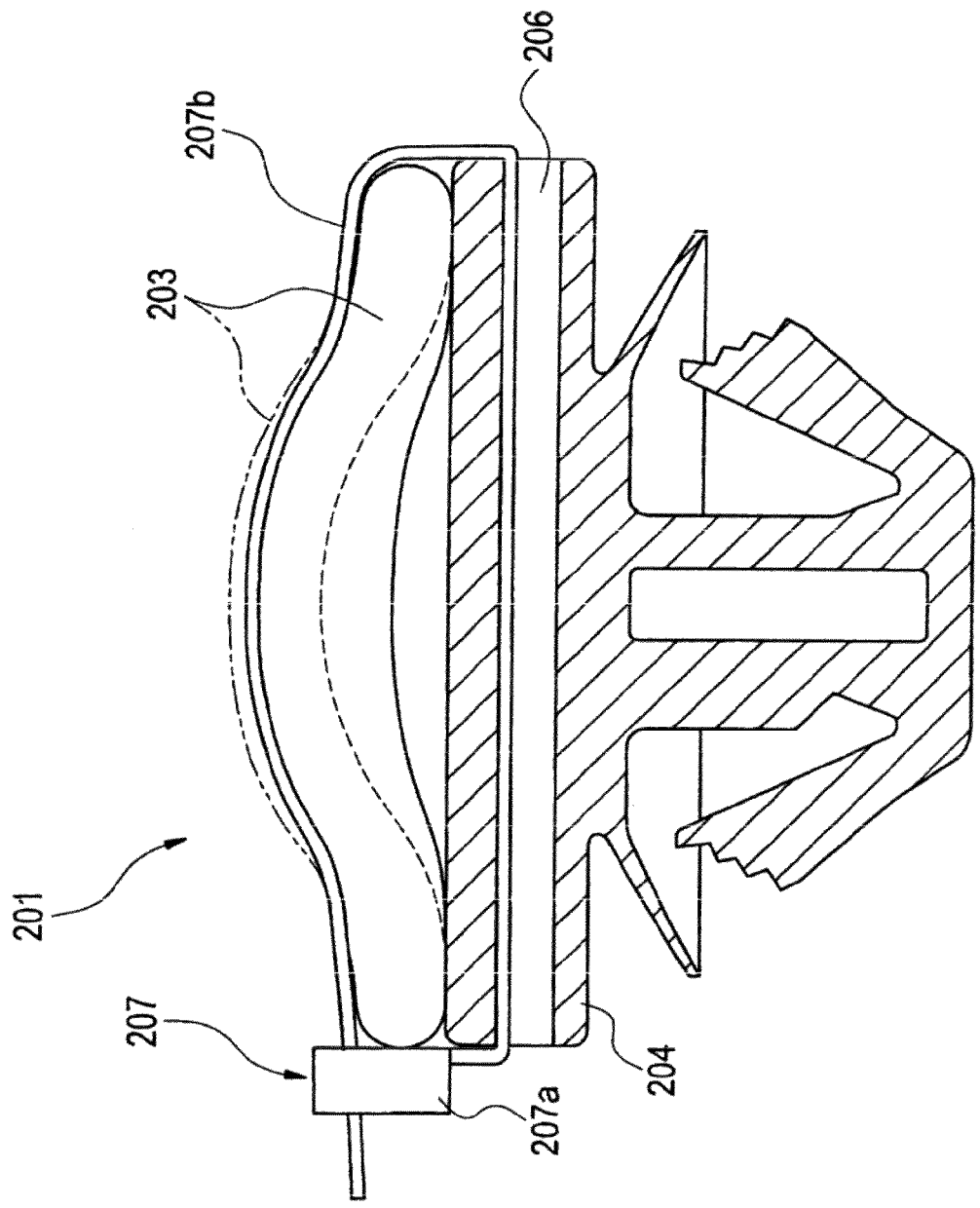
FIG. 13 is a cross-sectional view showing a flattened condition of a wire harness.
Figure 14:
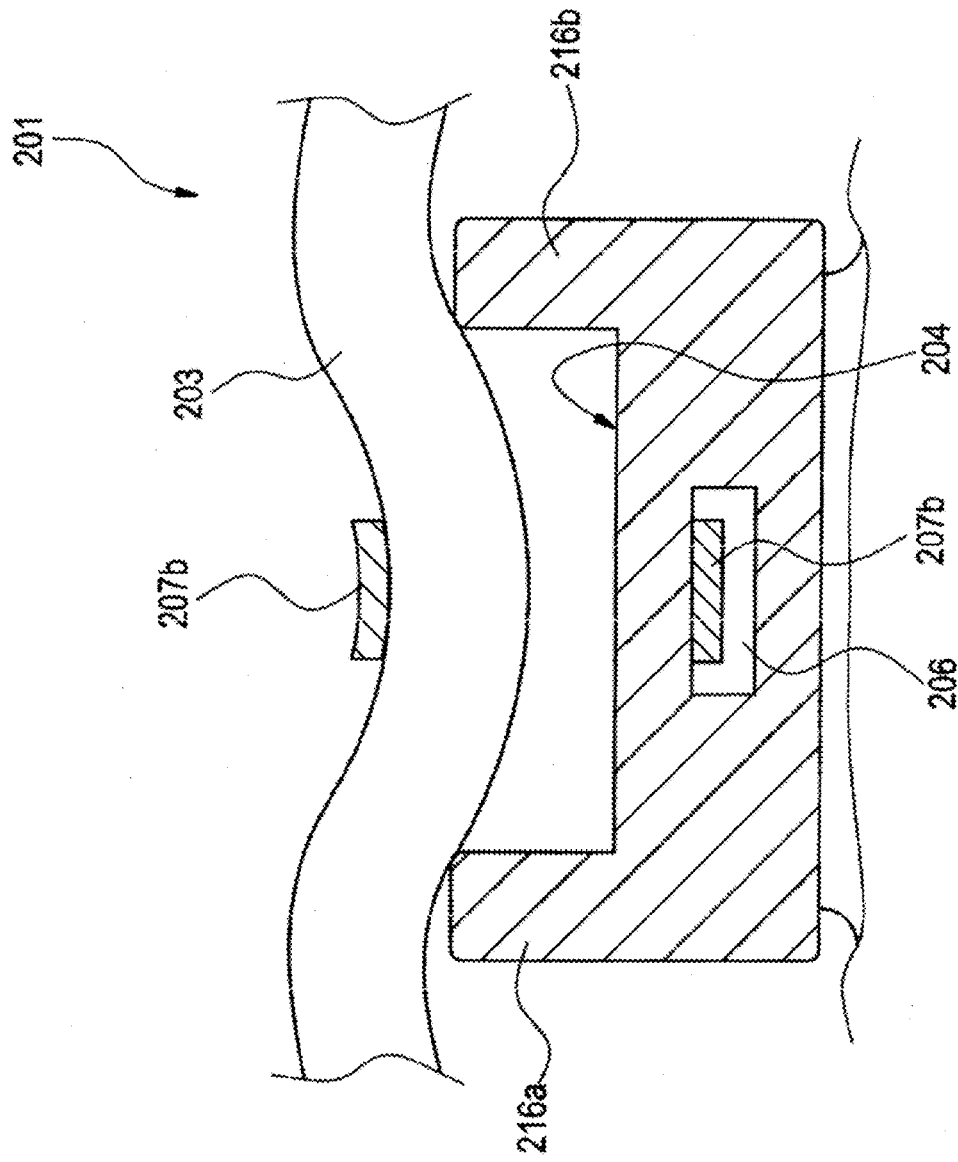
FIG. 14 is a cross-sectional view showing a flexibly-deformed condition of the wire harness.

FIG. 12 is a perspective view showing a wire harness-flattening band 201 representing a sixth embodiment, FIG. 13 is a cross-sectional view showing a flattened condition of a wire harness, and FIG. 14 is a cross-sectional view showing a flexible deformation of the wire harness.

In the band 201 of this sixth embodiment, protruded portions 216a, 216b are formed respectively at both ends of a wire harness fixing portion 204 spaced from each other in a widthwise direction. Namely, the plurality of protruded portions 216a, 216b for bending a flattened portion of linear members (not shown) into an arcuate shape in a direction intersecting a longitudinal direction of the linear members are formed at a surface of the wire harness-fixing portion 204, and are spaced a predetermined distance from each other in the longitudinal direction of the wire harness 203.

For fixing the linear members of the wire harness 203 to the wire harness-fixing portion 204, the linear members of the wire harness 203 are placed on the two protruded portions 216a, 216b as in the above fifth embodiment, and a binding band 207 is wound and is tightened as described above.

As a result, the linear members of the wire harness 203 are widened on the two protruded portions 216a, 216b in conformity with the surface shape of the two protruded portions 216a, 216b and are flattened as indicated in an imaginary line in FIG. 13.

On the other hand, a valley is formed between the two protruded portions 216a, 216b, and the linear members of the wire harness 203 are fastened at this valley portion by a binding band 207. Therefore, a lower surface of the linear members of the wire harness 203 in this valley portion is lower than the upper surface position of the two protruded portions 216a, 216b as indicated in a solid line in FIG. 13.

Therefore, the linear members of the wire harness 203 are flexibly deformed on the wire harness fixing portion 204 as shown in FIG. 14, and the effect of preventing displacement of the wire harness 203 in the longitudinal direction is enhanced.

In this embodiment, also, the whole of the band 201 can be fixed to a panel 211 as in the above fourth embodiment.

As described above, in this embodiment, also, the linear members of the wire harness 203 can be flattened in conformity with the surface shape of the wire harness fixing portion 204, that is, the surface shape of the two protruded portions 216a, 216b. Furthermore, by providing the two protruded portions 216a, 216b, the linear members of the wire harness 203 can be flexibly deformed, and by this flexible deformation, the displacement of the wire harness 203 in the longitudinal direction can be restrained more positively.

Furthermore, as in the above fourth embodiment, a protector or the like is unnecessary, and the wire harness 203 can be installed even in a narrow space.

Seventh Embodiment

Figure 15:
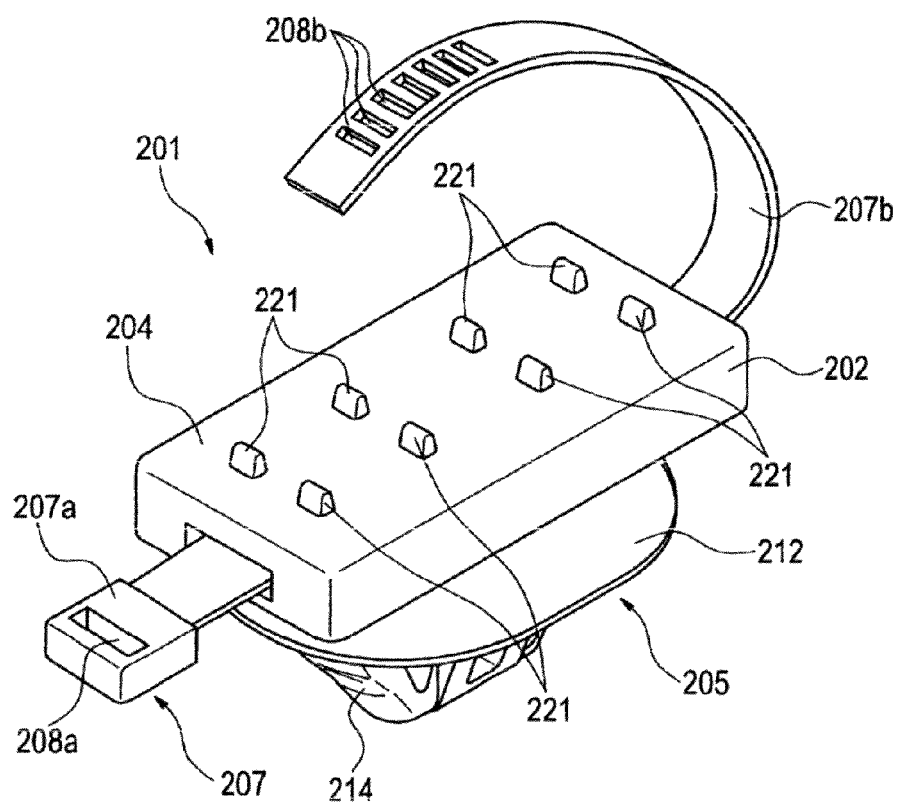
FIG. 15 is a perspective view showing a wire harness-flattening band representing a seventh embodiment of the present invention.
Figure 16:
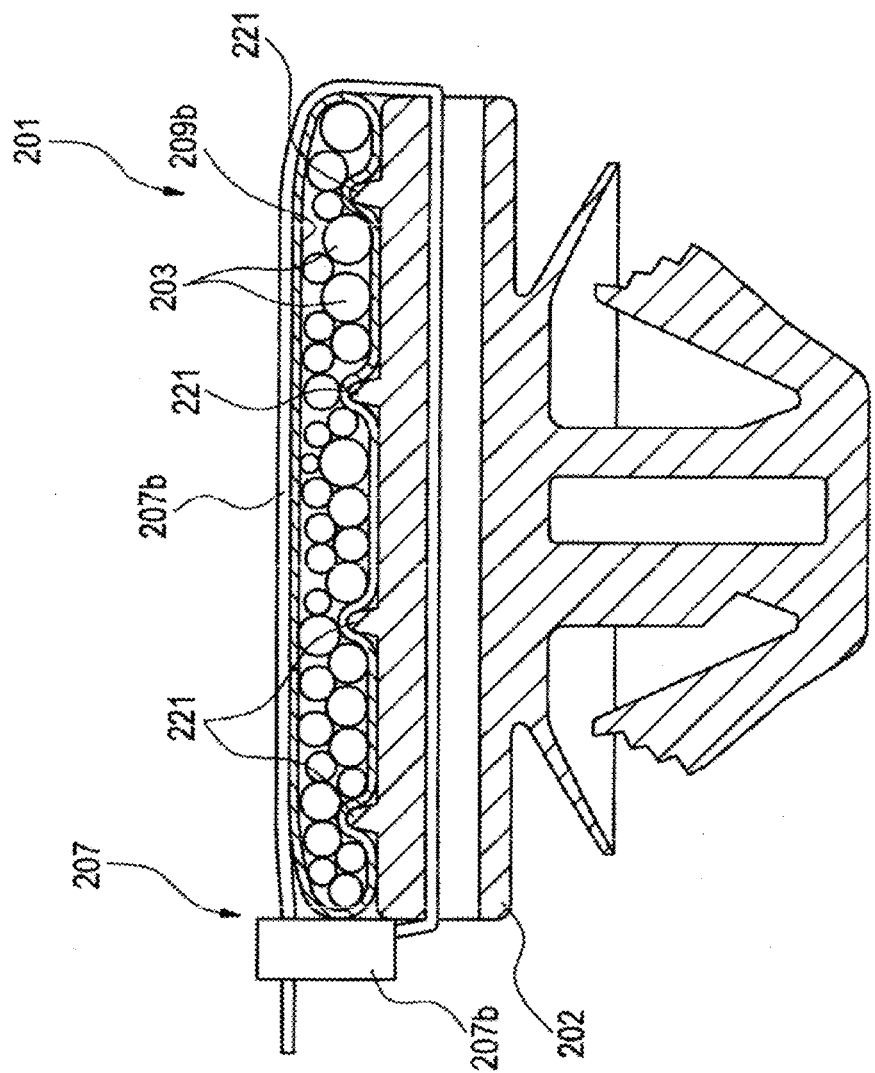
FIG. 16 is a cross-sectional view showing a flattened condition of a wire harness.

FIG. 15 is a perspective view showing the construction of a wire harness-flattening band 201 representing a seventh embodiment of the present invention, and FIG. 16 is a cross-sectional view showing a flattened condition of a wire harness.

In this seventh embodiment, a plurality of projections 221 are formed on the wire harness fixing portion 204 shown in the above fourth embodiment, and the other construction may be similar to the above construction. Although the plurality of projections 221 the number of which are eight are provided at predetermined intervals in each of a widthwise direction and a longitudinal direction, the number and intervals of the projections 221 are not limited.

For flattening linear members 209 of the wire harness 203, the linear members 209 of the wire harness 203 are placed on the wire harness fixing portion 204, and a binding band 207 is wound and is tightened as described above. As a result, the linear members 209 of the wire harness 203 are flattened on the wire harness fixing portion 204 and are fixed thereto as shown in FIG. 16, and with the tightening of the binding band 207, the plurality of projections 221 bite in between the linear members 209 as shown in FIG. 16. Therefore, the whole of the linear members 209 of the wire harness 203 is retained on the wire harness fixing portion 204, and displacement of the wire harness 203 in the longitudinal direction can be prevented.

As described above, in the construction of this seventh embodiment, the displacement of the wire harness 203 can be prevented more positively, and besides advantages similar to those of the above fourth embodiment can be obtained.

Eighth Embodiment

Figure 17:
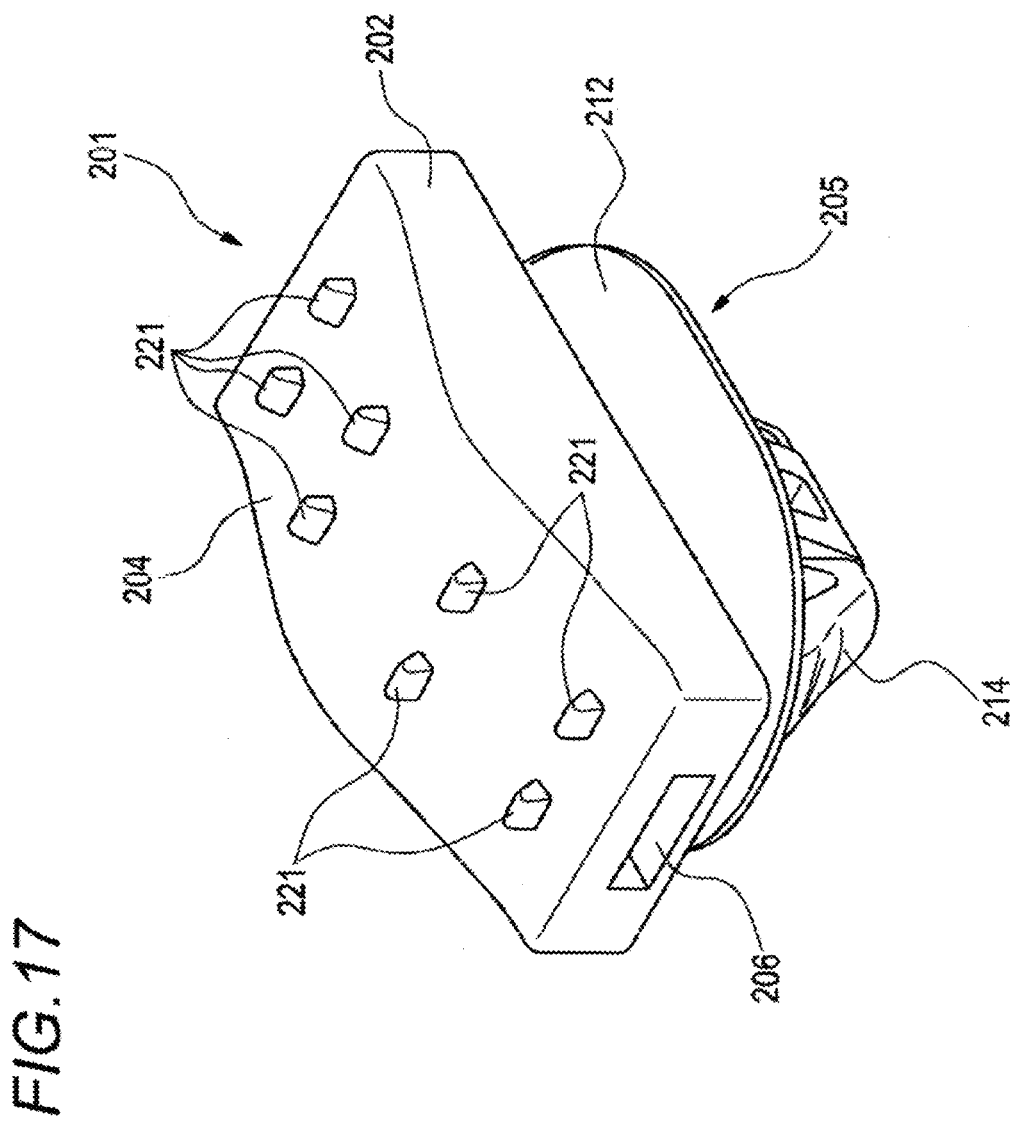
FIG. 17 is a perspective view showing a wire harness-flattening band representing an eighth embodiment of the present invention.
Figure 18:
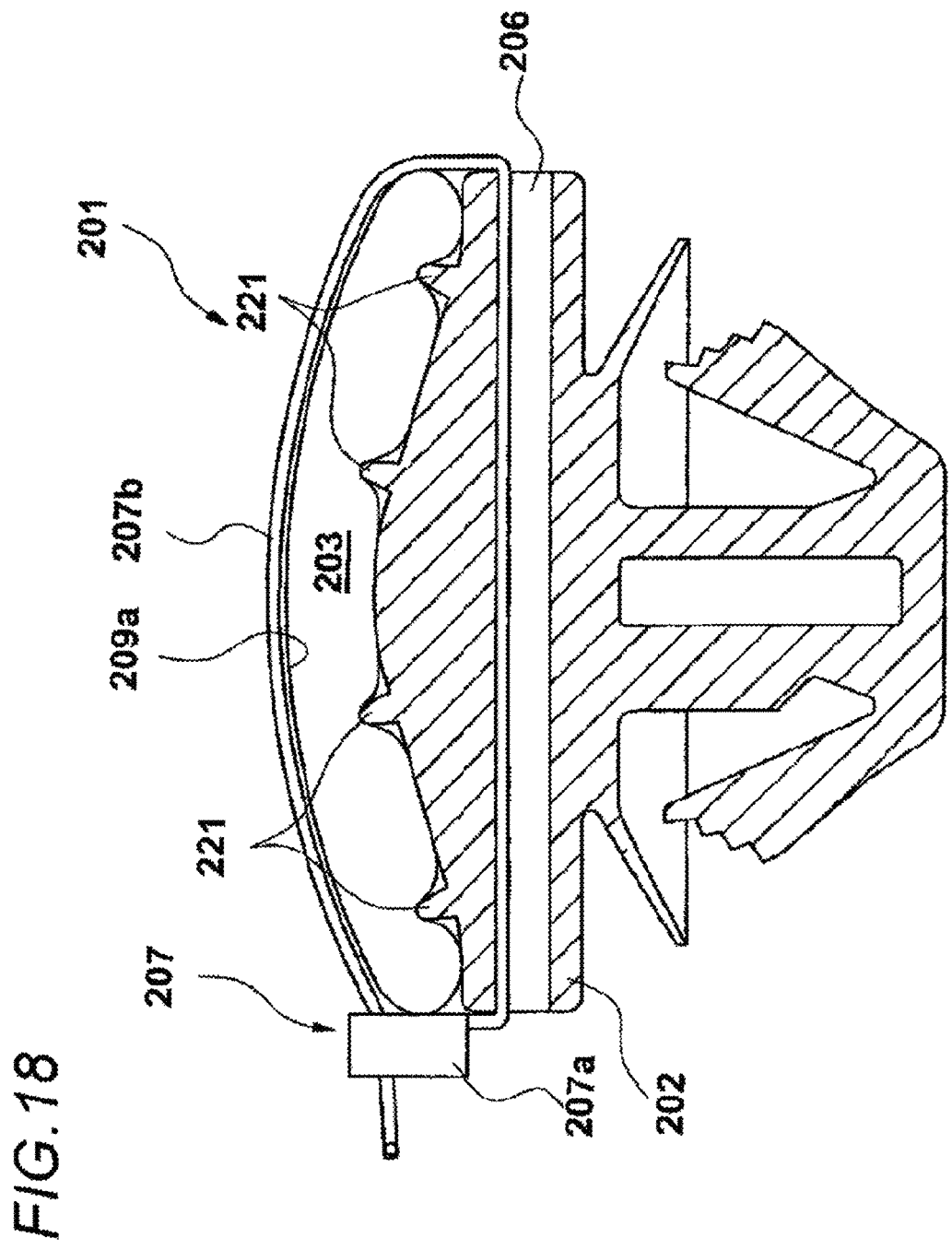
FIG. 18 is a cross-sectional view showing a flattened condition of a wire harness.

FIG. 17 is a perspective view showing an eighth embodiment of the present invention, and FIG. 18 is a cross-sectional view showing a flattened condition and a retained condition of a wire harness.

In this eighth embodiment, a plurality of projections 221 are formed on the wire harness fixing portion 204 shown in the above fifth embodiment. However, in this eighth embodiment, although the recesses 204b shown in the above fifth embodiment are not formed, the other construction is similar to that of the above fifth embodiment.

Although the plurality of projections 221 the number of which are eight are provided at predetermined intervals in each of a widthwise direction and a longitudinal direction, the number and intervals of the projections 221 are not limited.

For flattening linear members (not shown) of the wire harness 203, the linear members of the wire harness 203 are placed on the wire harness fixing portion 204, and a binding band 207 is wound and is tightened as described above. As a result, the linear members of the wire harness 203 are flattened on the wire harness fixing portion 204 and are fixed thereto as shown in FIG. 18, and with the tightening of the binding band 207, the plurality of projections 221 bite in between the linear members. Therefore, the whole of the linear members of the wire harness 203 is retained on the wire harness fixing portion 204, and displacement of the wire harness 203 in the installing direction can be prevented.

As described above, in the construction of this eighth embodiment, the displacement of the wire harness 203 can be prevented more positively, and besides advantages similar to those of the above fifth embodiment can be obtained.

Ninth Embodiment

Figure 19:
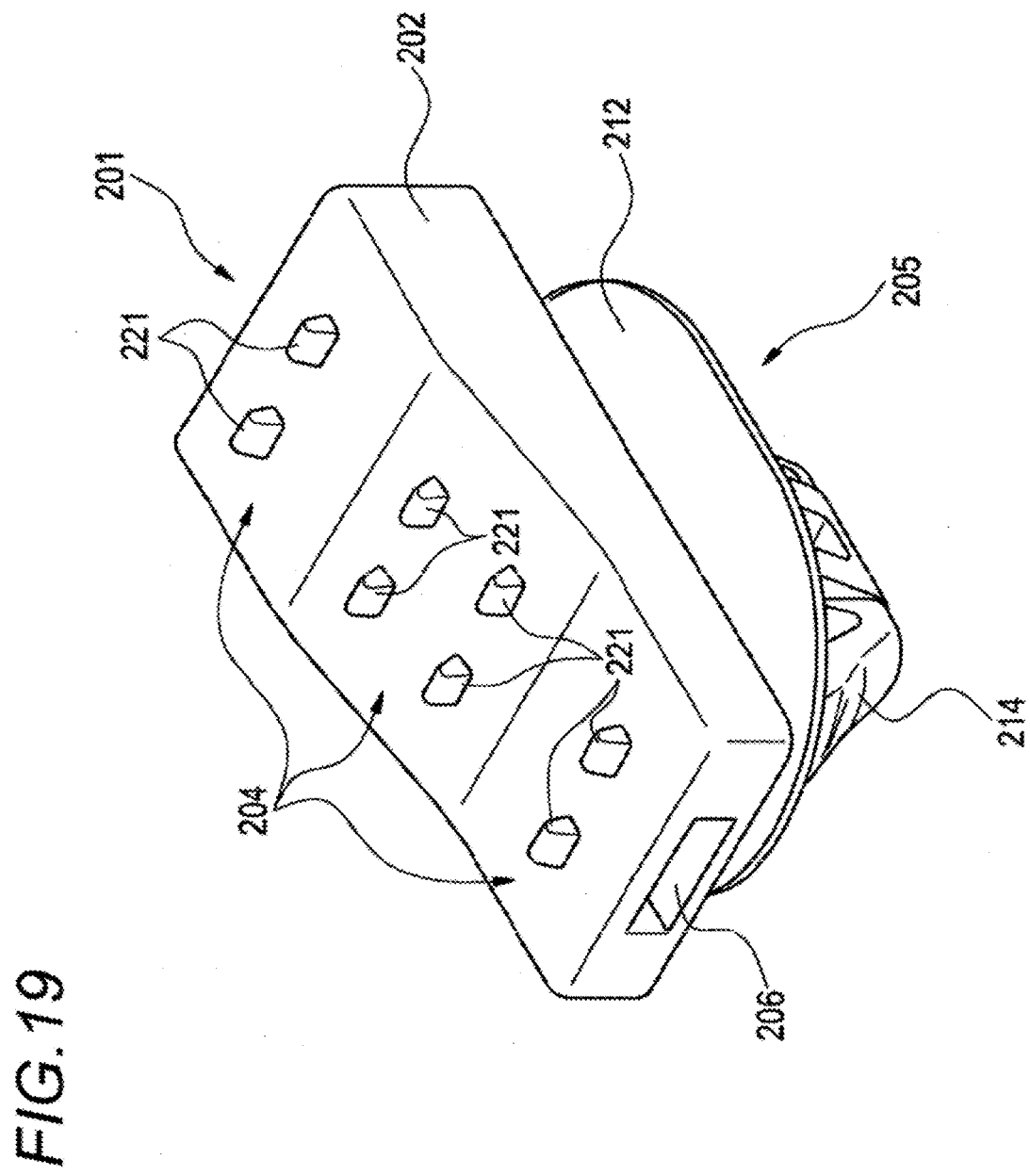
FIG. 19 is a perspective view showing a wire harness-flattening band representing a ninth embodiment of the present invention.
Figure 20:
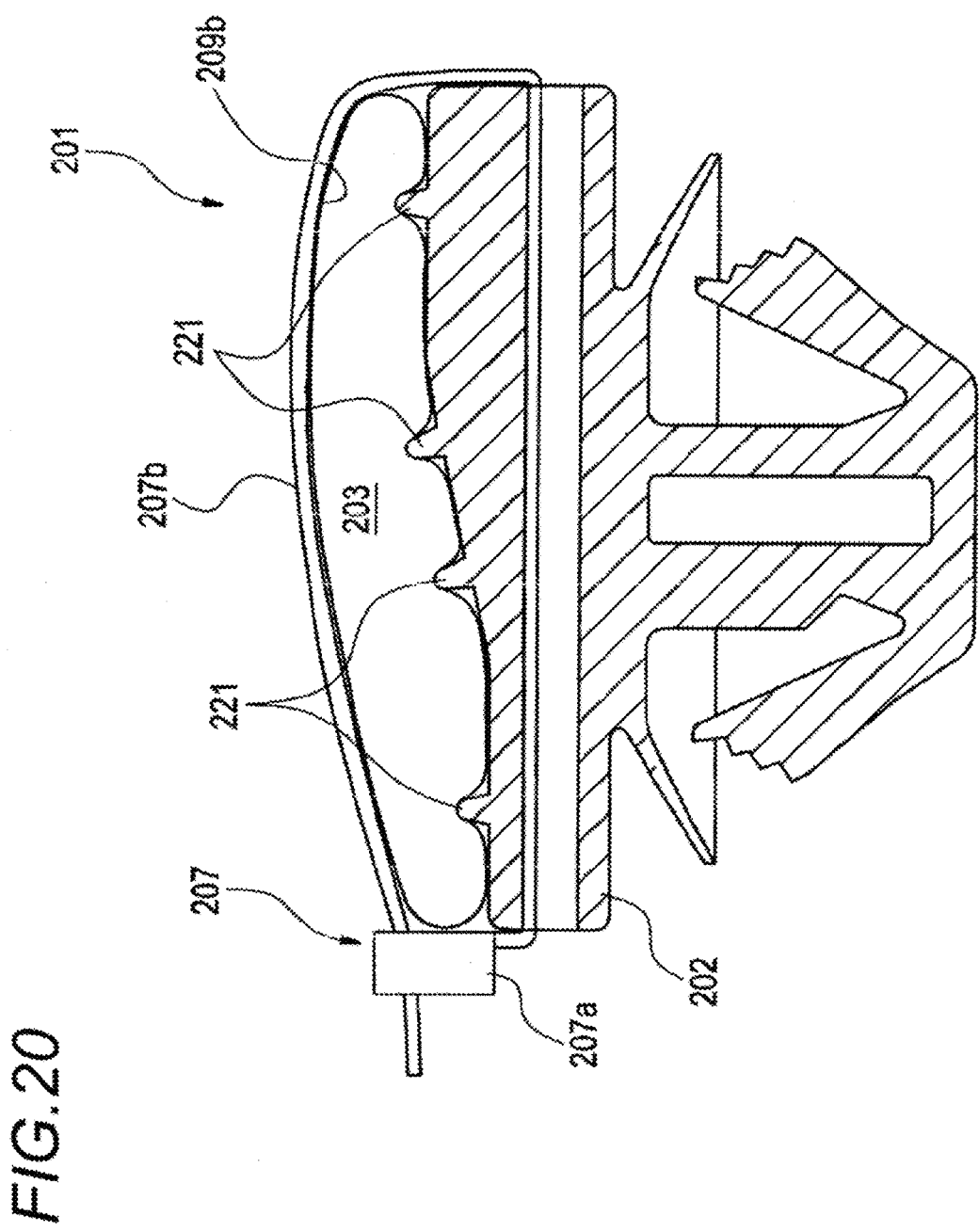
FIG. 20 is a cross-sectional view showing a flattened condition of a wire harness.

FIG. 19 is a perspective view showing the construction of a wire harness-flattening band 201 representing a ninth embodiment of the present invention, and FIG. 20 is a cross-sectional view showing a flattened condition of a wire harness and a retaining action.

In this ninth embodiment, a step is formed on a surface of a wire harness fixing portion 204, and an intermediate portion thereof is formed into a slanting surface. Namely, the surface of the wire harness fixing portion 204 has the slanting surface so formed that a flattened portion of linear members (not shown) can slant in a direction intersecting a longitudinal direction of the linear members. Although projections 221 are formed on the slanting surface and step surfaces, the number and positions of formation thereof are not limited.

For flattening the wire harness 203, the linear members of the wire harness 203 are placed on the wire harness fixing portion 204, and a binding band 207 is wound and is tightened as described above. As a result, the linear members of the wire harness 203 are flattened on the wire harness fixing portion 204 and are fixed thereto as shown in FIG. 20, and with the tightening of the binding band 207, the plurality of projections 221 bite in between the linear members. Therefore, the whole of the linear members of the wire harness 203 is retained on the wire harness fixing portion 204, and displacement of the wire harness 203 in the installing direction can be prevented.

As described above, in the construction of this ninth embodiment, the displacement of the wire harness 203 can be prevented more positively, and besides advantages similar to those of the above embodiments can be obtained.

Incidentally, the present invention is not limited to the above-mentioned embodiments, and modifications, improvements, etc., can be suitably made. And besides, the material, shape, dimensions, numerical values, form, number, disposition, etc., of each of the constituent elements of the above-mentioned embodiments are arbitrary and are not limited in so far as the present invention can be achieved.

For example, although the above embodiments of the wire harness installation structures are the wire harness installation structures within the vehicle seat, the object in which the wire harness is to be installed is not limited to the vehicle seat, and may be any one.

Furthermore, the size, shape, etc., of the wire harness fixing portion of the wire harness-flattening band can be freely changed according to the thickness, installation position, etc., of the wire harness. The binding band may be formed into a larger width so as to also serve to protect the wire harness. The linear member includes an outer tube, a sheath, etc., besides the wire.

Figure 21:
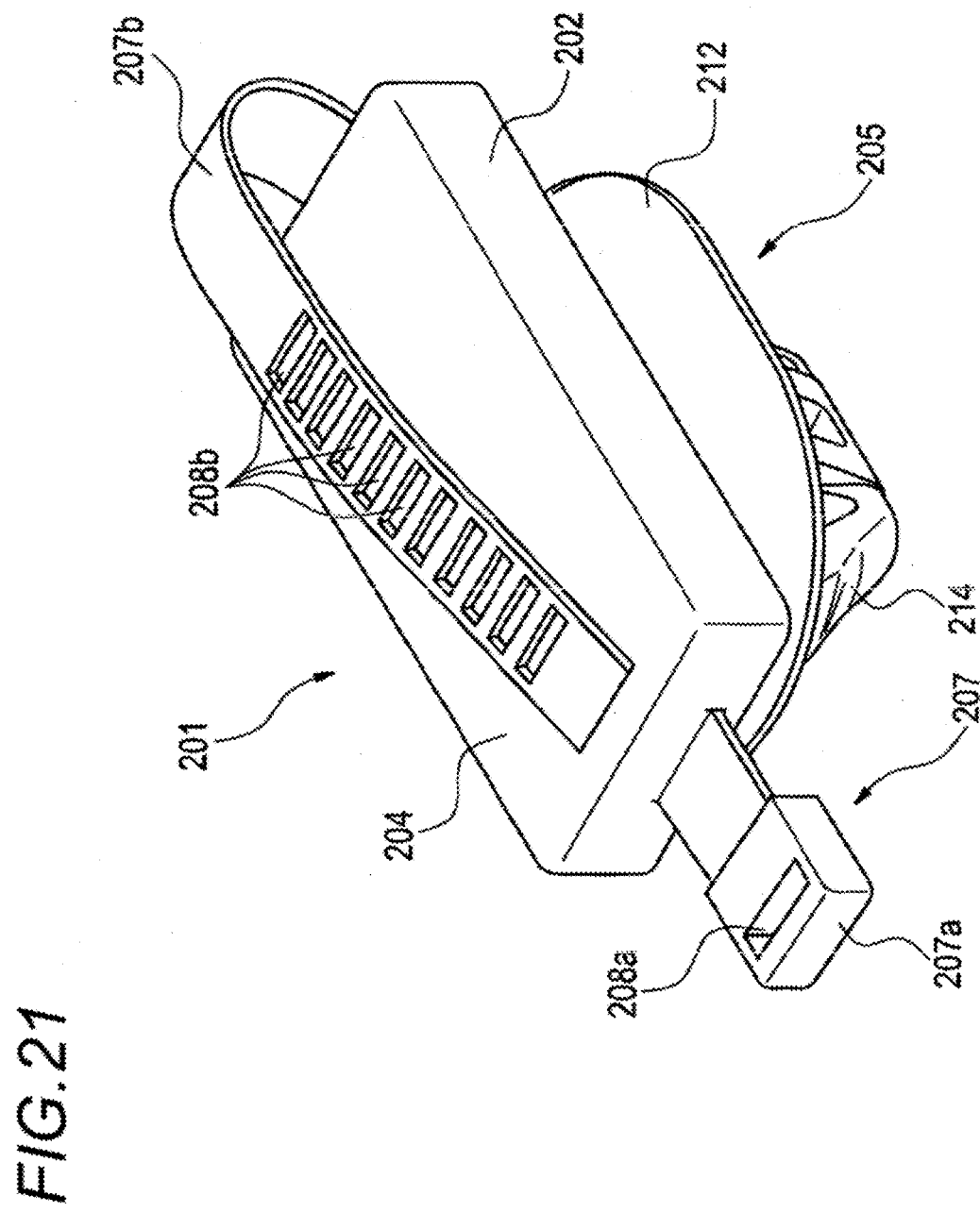
FIG. 21 is a perspective view showing a modified example of a binding band.
Figure 22:
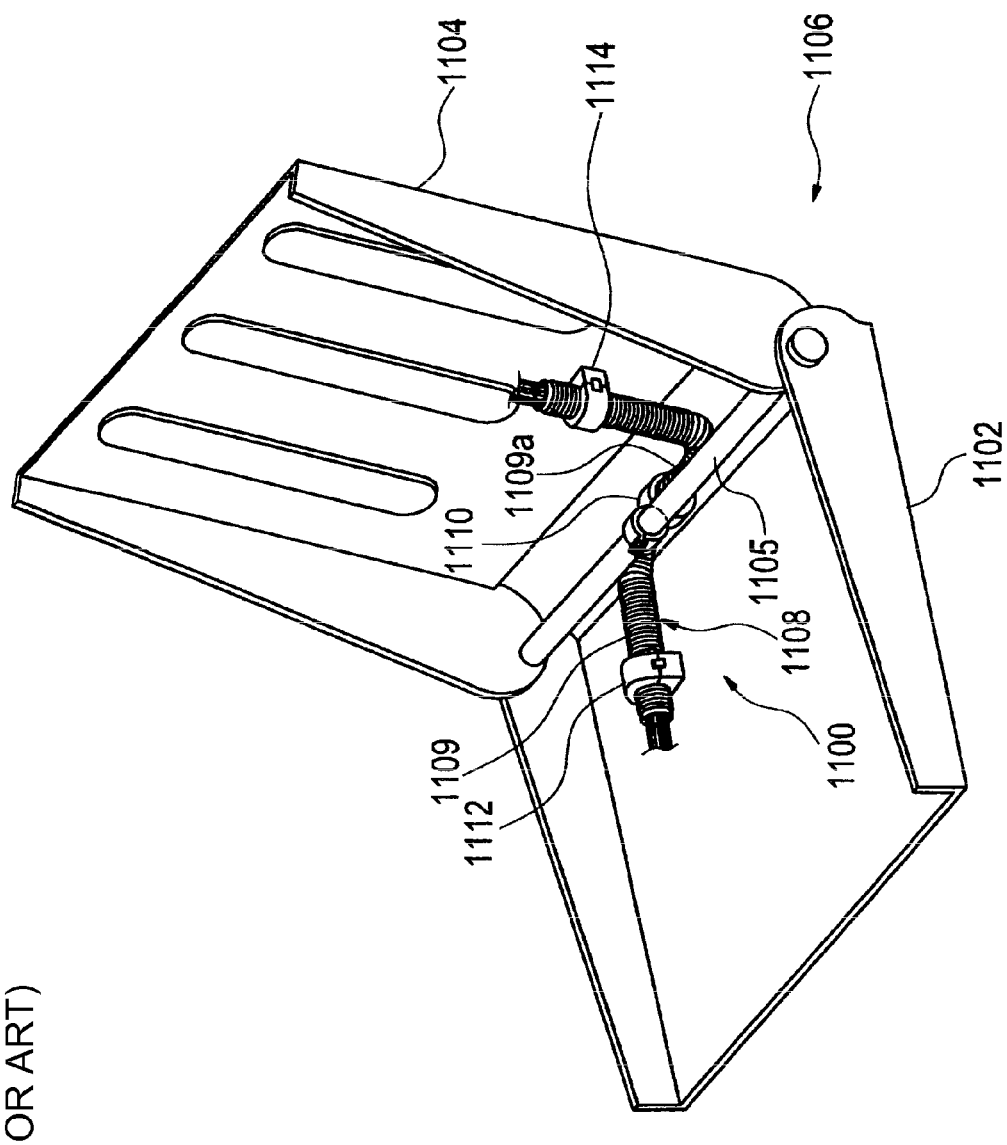
FIG. 22 is a view showing the installation of a conventional wire harness.
Figure 23:
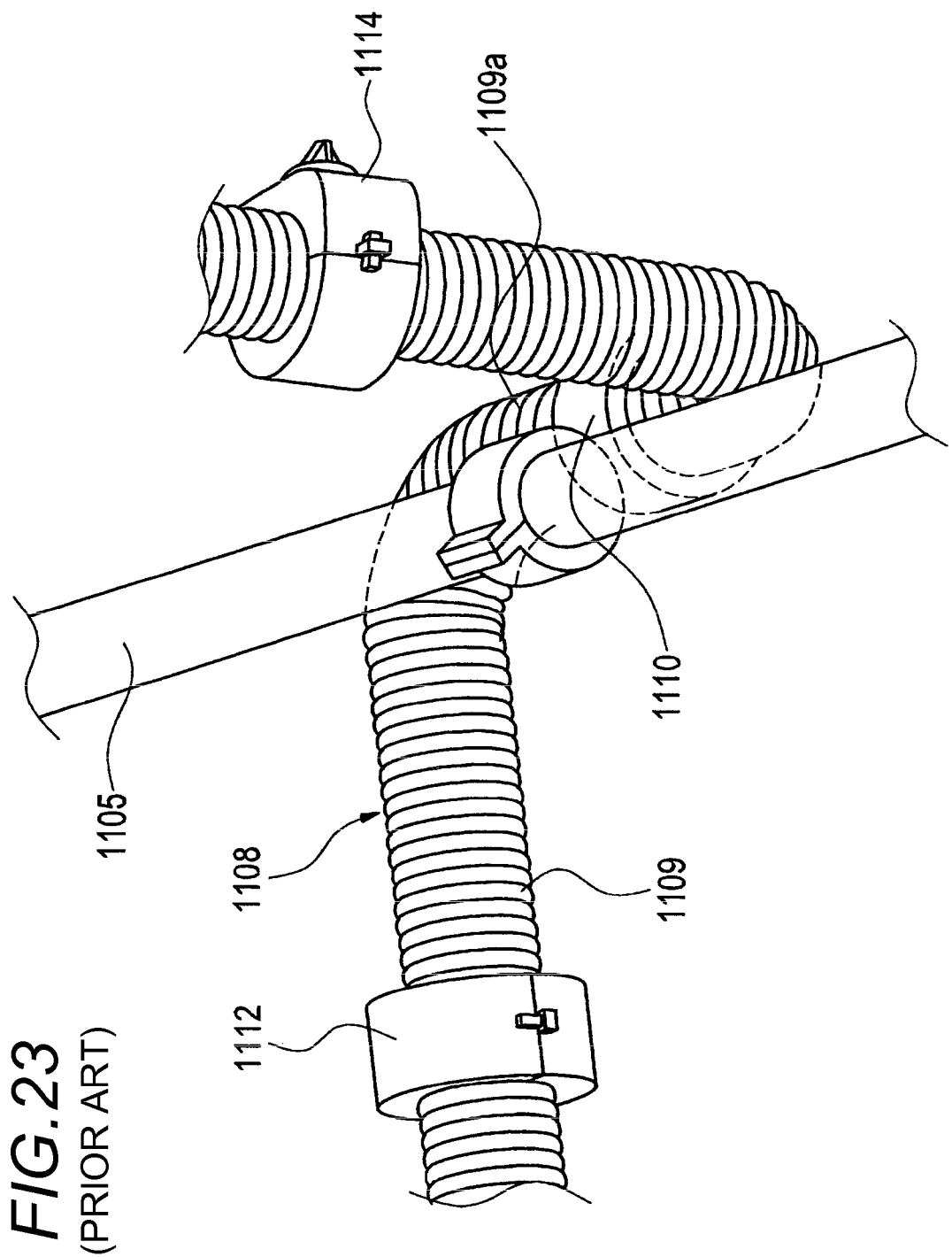
FIG. 23 is an enlarged view of an important portion of FIG. 22.
Figure 24:
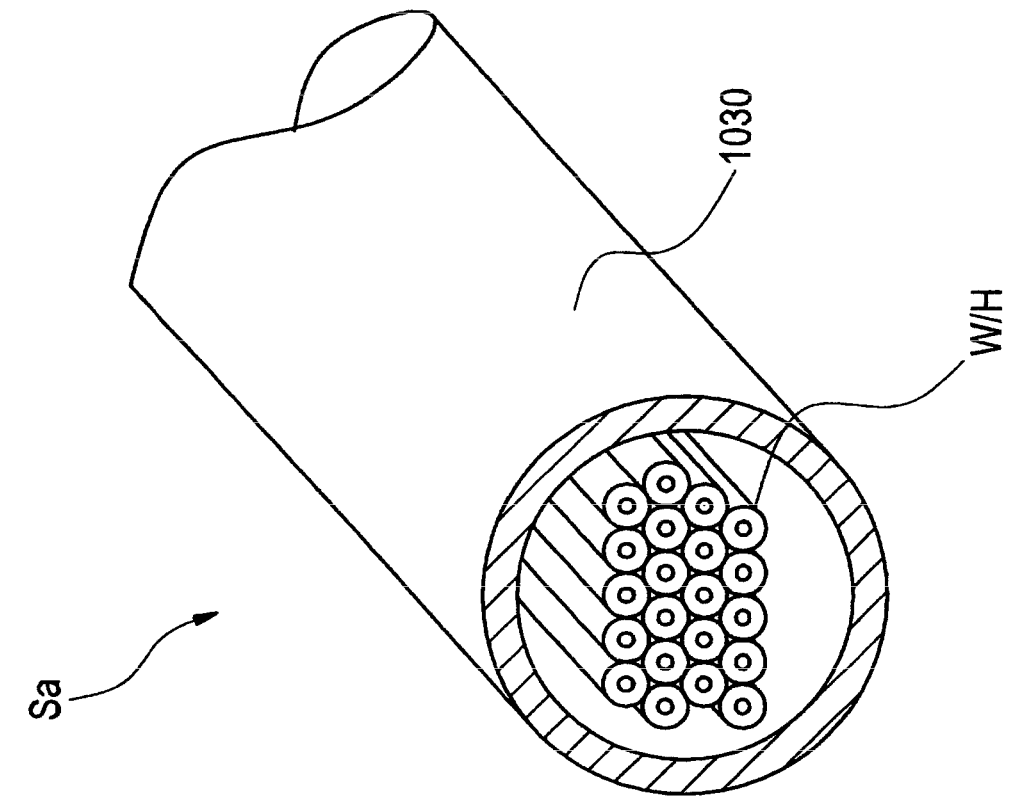
FIG. 24 is a perspective view showing the shape of the conventional wire harness.
Figure 25:
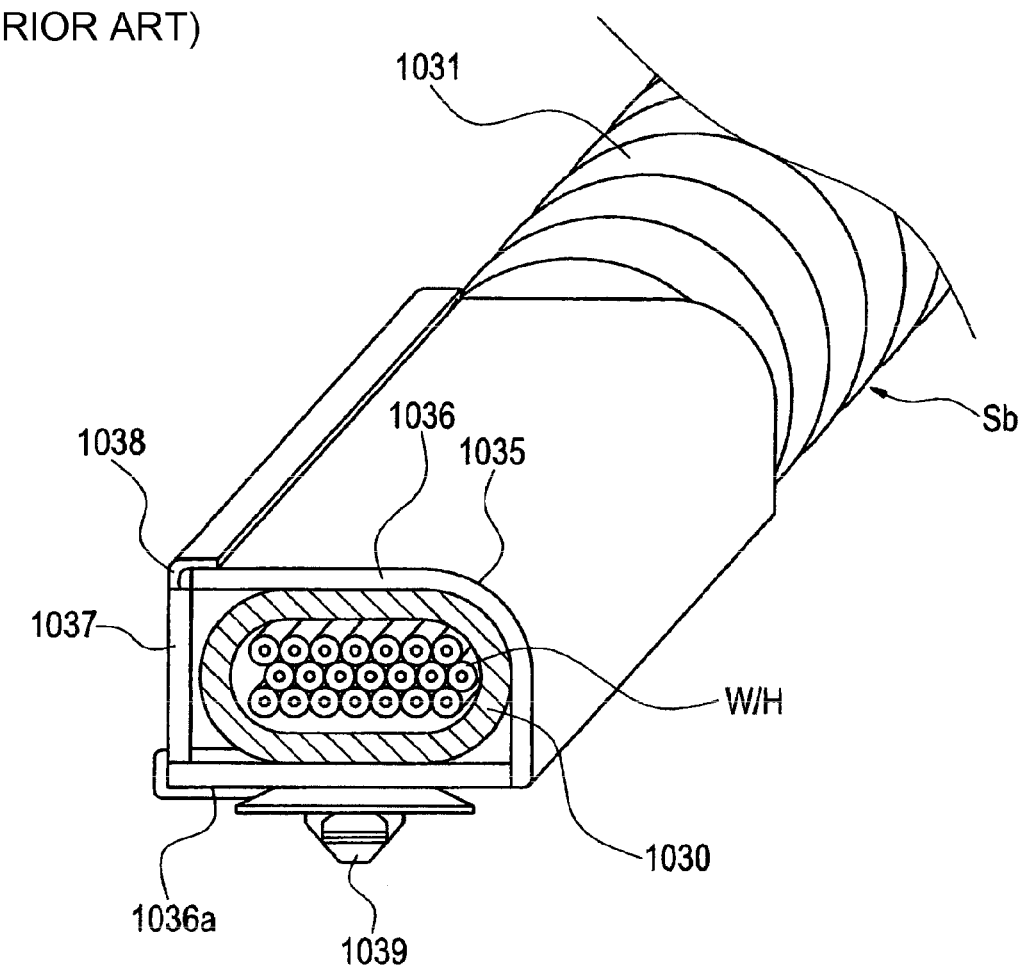
FIG. 25 is a perspective view showing one example of a conventional wire harness installation structure.

Furthermore, the binding member may be formed integrally with the wire harness fixing portion of the band. Namely, although the binding band 207 in each of the above embodiments is separate from the wire harness fixing portion 204, the binding band 207 may be integrated with the wire harness fixing portion 204 as shown in FIG. 21. FIG. 21 shows a modified example of the binding band 207 of the fourth embodiment, and the bands in the other embodiments may have the same construction as this band. With this construction, the wire harness fixing portion 204 and the binding band 207 are always integral with each other, it is not feared that the binding band 207 may be lost, and the efficiency of the operation is enhanced.

Furthermore, each of the above embodiments is constructed such that the band is provided with the retaining member, but may be constructed such that the provision of the retaining member is omitted. In the cases where the retaining on a mating mounting member is unnecessary and where the installation region is such that the wire harness is fixed by other retaining means, the installation ability is enhanced merely by flattening the wire harness because of this construction in which the provision of the retaining member of the band is omitted.

INDUSTRIAL APPLICABILITY

In the wire harness installation structure of the present invention in the vehicle seat, the installation can be made in such a manner that the flattened portion formed partially at the wire harness is curved with a small radius, twisted and bent, and therefore the efficiency of the installing operation can be enhanced. And besides, when the flattened potion is curved, the curve radius will not become large, and furthermore the flattened portion can be installed in a bent condition, and therefore the installation region can be made space-saving.

Furthermore, in the wire harness-flattening band of the present invention, by fastening and fixing the linear members of the wire harness to the wire harness fixing portion by the use of the binding member, the linear members of the wire harness can be flattened to be disposed along the surface of the wire harness fixing portion. And besides, the linear members of the wire harness are fastened and fixed to the wire harness fixing portion, and therefore when the wire harness is installed in a bent condition or when the wire harness is pulled and pushed at the time of installation, it is less liable to be displaced.

Furthermore, a protector or the like is unnecessary, and therefore the wire harness can be installed in a flattened condition even in a narrow space without using the protector, and the wire harness-installing ability is enhanced.

Furthermore, a mold, etc., for the production of the protector are unnecessary, and with a combination of these, the low-cost design can be achieved, and also the efficiency of the installing operation and the degree of freedom of design of the vehicle and electronic equipments using the wire harness can be enhanced.

Although the present invention has been described in detail with reference to the specified embodiments, it will be manifest to those skilled in the art that various changes and modifications can be added without departing form the spirit and scope of the present invention.

This application is based on Japanese Patent Application (Patent Application No. 2008-166251) filed on Jun. 25, 2008 and Japanese Patent Application (Patent Application No. 2008-213682) filed on Aug. 22, 2008, and the contents thereof are incorporated herein by reference.

DESCRIPTION OF REFERENCE NUMERALS 10 wire harness
10a flat portion
12 side frame
13 seat back
16 pivot shaft
18 wire harness fixing portion
20 clip
21 protective member
22 protector
24 inner trim
201 wire harness-flattening band
202 base plate portion
203 wire harness
204 wire harness fixing portion
204a mountain-shape
204b recess
205 retaining member
206 through hole
207 binding band
207a retaining portion
207b band portion
208a insertion hole
208b retaining hole
209 linear member
209a protective member
211 panel of vehicle or the like
211a insertion mounting hole
212 flange portion
213 axis portion
214 retaining portion
216a, 216b protruded portion
221 projection

The invention claimed is:

1. A wire harness installation structure in which a wire harness formed by bundling a plurality of wires into a generally-circular form in a cross-sectional view is installed,
wherein the wire harness has a flat portion which is formed by thinning and flattening a part of a bundle of the plurality of wires over a predetermined length along an extending direction of the wire harness and are kept in a flat shape,
wherein the bundle of the plurality of wires is kept in the flat shape by at least two binding members wound around the outside of the flat portion at distal end portions of the flat portion,
wherein the flat portion extends along the extending direction of the wire harness and is formed between the at least two binding members such that the wire harness has at least two generally-circular portions on the outside of and adjacent to the at least two binding members,
wherein the at least two binding members are separated from each other along the extending direction of the wire harness.

2. The wire harness installation structure as set forth in claim 1, wherein the bundle of the plurality of wires is covered by a protective member made by resin along the extending direction, and are kept, together with the protective member, in the flat shape.

3. The wire harness installation structure as set forth in claim 1, wherein the bundle of the plurality of wires is received in a protector which includes a receiving space having a flat shape in the cross sectional view for receiving the bundle of the plurality of wires, so that the bundle of the plurality of wires is kept in the flat shape.

4. The wire harness installation structure as set forth in claim 1, wherein an installing direction of the wire harness is changed by bending the flat portion.

5. The wire harness installation structure as set forth in claim 4, wherein the wire harness is configured to be installed on a pivotable member having at least two portions which are pivotable to each other by a pivot shaft,
wherein the flat portion is bendable around the pivot shaft and installed on the pivotable member in a bent condition.

6. The wire harness installation structure as set forth in claim 4, wherein the installing direction is changed by 90 degrees.

7. The wire harness installation structure as set forth in claim 1, wherein the flat portion has a cross-sectional area that is wider and thinner than a cross-sectional area of the generally-circular portion,
wherein the flat portion is configured to be bent in a forwards or backwards direction.

8. A wire harness-flattening band for partially flattening a linear member including a wire bundle of a wire harness, comprising:
a wire harness fixing portion; and
a binding member that fastens an outer periphery of the linear member in a direction intersecting a longitudinal direction of the linear member, and fixes the linear member to a surface of the wire harness fixing portion,
wherein a portion of the linear member disposed on the surface of the wire harness fixing portion is pressed against the wire harness fixing portion by a fastening action of the binding member without interposing the binding member between the portion of the linear member and the surface of the wire harness fixing portion so that the portion of the linear member is flattened,
wherein the portion of the linear member that is flattened is disposed above the wire harness fixing portion.

9. The wire harness-flattening band as set forth in claim 8, wherein the wire harness fixing portion has a plate portion on which the surface is formed, and a surface shape of the plate portion is flat; and
wherein the linear member is pressed against the surface by the binding member.

10. The wire harness-flattening band as set forth in claim 8, wherein the surface of the wire harness fixing portion has a slanting surface so that the flattened portion of the linear member is formed so as to be slant in a direction intersecting the longitudinal direction of the linear member.

11. The wire harness-flattening band as set forth in claim 8, wherein a protruded portion for bending the flattened portion of the linear member into an arcuate shape in a direction intersecting the longitudinal direction of the linear member is provided on the surface of the wire harness fixing portion.

12. The wire harness-flattening band as set forth in claim 8, wherein a plurality of protruded portions for bending the flattened portion of the linear member into an arcuate shape in a direction intersecting the longitudinal direction of the linear member are provided on the surface of the wire harness fixing portion, and are spaced a predetermined distance from each other in the longitudinal direction.

13. The wire harness-flattening band as set forth in claim 8, wherein a plurality of retaining projections are provided on the surface of the wire harness fixing portion.

14. The wire harness-flattening band as set forth in claim 8, wherein the binding member is a binding band passed through a through hole of the wire harness fixing portion which extends in a direction intersecting the longitudinal direction of the linear member.

15. The wire harness-flattening band as set forth in claim 8, further comprising:
a retaining member that is formed integrally with the wire harness fixing portion so as to mount a wire harness fixing portion on the mating mounting member,
wherein the retaining member includes a flange portion, an axis portion projection from a center of the flange portion, and an elastically-deformably retaining portion attached to the axis portion which is inserted into the mating mounting member.

16. The wire harness-flattening band as set forth in claim 8, wherein the wire harness has a flat portion which is formed by thinning and flattening a part of the wire bundle over a predetermined length along an extending direction of the wire harness and are kept in a flat shape.

* * * * *